(12) United States Patent
Tang et al.

(10) Patent No.: US 11,792,631 B2
(45) Date of Patent: Oct. 17, 2023

(54) EMERGENCY CALL METHOD AND USER TERMINAL

(71) Applicant: HUAWEI TECHNOLOGIES CO., LTD., Guangdong (CN)

(72) Inventors: Chao Tang, Shenzhen (CN); Hongkang Wei, Xi'an (CN); Xuanjun Meng, Shenzhen (CN); Na Shi, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 254 days.

(21) Appl. No.: 17/427,508

(22) PCT Filed: Jan. 31, 2019

(86) PCT No.: PCT/CN2019/074167
§ 371 (c)(1),
(2) Date: Jul. 30, 2021

(87) PCT Pub. No.: WO2020/155013
PCT Pub. Date: Aug. 6, 2020

(65) Prior Publication Data
US 2022/0141636 A1 May 5, 2022

(51) Int. Cl.
*H04W 4/029* (2018.01)
*H04W 8/20* (2009.01)
(Continued)

(52) U.S. Cl.
CPC .............. *H04W 4/90* (2018.02); *H04W 4/029* (2018.02); *H04W 8/20* (2013.01); *H04W 84/042* (2013.01)

(58) Field of Classification Search
CPC ......... H04W 4/90; H04W 4/029; H04W 8/20; H04W 84/0472
(Continued)

(56) References Cited

U.S. PATENT DOCUMENTS

2015/0079979 A1 3/2015 Anchan
2015/0094062 A1* 4/2015 Niemi .................... H04W 48/16
455/435.2
(Continued)

FOREIGN PATENT DOCUMENTS

CN 1263682 A 8/2000
CN 101180896 A 5/2008
(Continued)

OTHER PUBLICATIONS

NTT DOCOMO, Additional condition for responding Emergency Service Support Indicator during EPS procedure at MME, SA WG2 Meeting #106, S2-144481,Nov. 17-21, 2014, San Francisco, U.S.A, 40 Pages.
(Continued)

*Primary Examiner* — Ted M Wang
(74) *Attorney, Agent, or Firm* — WOMBLE BOND DICKINSON (US) LLP

(57) ABSTRACT

Embodiments of the invention discloses an emergency call method and a user terminal. The method includes: obtaining a home public land mobile network (HPLMN) and an equivalent HPLMN (EHPLMN) from a SIM card of a user terminal; receiving an emergency call operation of a user; receiving, in response to the emergency call operation, a public land mobile network (PLMN) list broadcast by an access network device, which is in a multi-operator core network (MOCN), and the PLMN list includes a plurality of PLMNs that share the access network device; when the PLMN list includes the HPLMN or the EHPLMN, determining that the HPLMN or the EHPLMN is an optimal PLMN; and making an emergency call through a core network of the optimal PLMN. Thus, an emergency call center can obtain a phone number of the user terminal.

20 Claims, 10 Drawing Sheets

(51) Int. Cl.
*H04W 4/90* (2018.01)
*H04W 84/04* (2009.01)

(58) Field of Classification Search
USPC ...................................................... 455/404.2
See application file for complete search history.

(56) References Cited

U.S. PATENT DOCUMENTS

| | | |
|---|---|---|
| 2017/0005914 A1 | 1/2017 | Edge et al. |
| 2017/0055141 A1 | 2/2017 | Kim et al. |
| 2018/0063774 A1 | 3/2018 | Gupta et al. |
| 2018/0227419 A1 | 8/2018 | Stojanovski et al. |

FOREIGN PATENT DOCUMENTS

| | | |
|---|---|---|
| CN | 101312421 A | 11/2008 |
| CN | 102118721 A | 7/2011 |
| CN | 102204177 A | 9/2011 |
| CN | 102238699 A | 11/2011 |
| CN | 102934487 A | 2/2013 |
| CN | 102960024 A | 3/2013 |
| CN | 103222309 A | 7/2013 |
| CN | 105933882 A | 9/2016 |
| CN | 106170125 A | 11/2016 |
| CN | 107431885 A | 12/2017 |
| CN | 107734489 A | 2/2018 |
| CN | 107852578 A | 3/2018 |
| CN | 108601017 A | 9/2018 |
| CN | 2018924809 A | 11/2018 |
| CN | 109155908 A | 1/2019 |
| CN | 108370538 B | 10/2020 |
| EP | 3429258 A1 | 1/2019 |
| IN | 201747029310 A | 8/2017 |
| WO | 2014161140 A1 | 10/2014 |
| WO | 2016085647 A1 | 6/2016 |
| WO | 2018093948 A1 | 5/2018 |
| WO | 2018149046 A1 | 8/2018 |
| WO | 2018170697 A1 | 9/2018 |

OTHER PUBLICATIONS

3rd Generation Partnership Project; Technical Specification Group Radio Access Network; User Equipment (UE) procedures in idle mode and procedures for cell reselection in connected mode (Release 15), 3GPP TS 25.304 V15.0.0 (Jun. 2018), 58 pages.

3rd Generation Partnership Project; Technical Specification Group Core Network and Terminals; Non-Access-Stratum (NAS) functions related to Mobile Station (MS) in idle mode(Release 13), 3GPP TS 23.122 V13.6.0, Sep. 2016, 49 pages.

* cited by examiner

ID USER TERMINAL

EMERGENCY CALL METHOD AND USER TERMINAL

CROSS-REFERENCE TO RELATED APPLICATIONS

This application is a National Stage of International Application No. PCT/CN2019/074167 filed on Jan. 31, 2019, which is hereby incorporated by reference in its entirety.

TECHNICAL FIELD

Embodiments of the present invention relates to the field of terminal technologies, and in particular, to an emergency call method and a user terminal.

BACKGROUND

An emergency call means that an alarm number or an emergency number such as 112, 110, 119, or 120 is called through a mobile phone. Urgency of these numbers makes all countries have a regulation that these numbers can be called through any network available at that time. FIG. 1 is a schematic diagram in which a user terminal is used to make an emergency call through an MOCN (multi-operator core network) network. In the MOCN network, one radio network can be connected to core network nodes of a plurality of operators. As shown in FIG. 1, a public land mobile network (PLMN) 1 of an operator 1, a PLMN 2 of an operator 2, and a PLMN 3 of an operator 3 belong to the MOCN network, and the PLMN 1 of the operator 1, the PLMN 2 of the operator 2, and the PLMN 3 of the operator 3 share one base station, but core networks of the PLMN 1, the PLMN 2, and the PLMN 3 are independent of each other.

As shown in FIG. 1, a subscriber identification module (SIM) card of the operator 1 is used in the user terminal to make an emergency call. In a process of making the emergency call through the user terminal, as shown in a dashed arrow, the user terminal may select one of three communication paths a, b, and c to communicate with an emergency call center. If the user terminal selects the communication path a to make the emergency call to the emergency call center, because the SIM card used in the user terminal is issued by the operator 1, the core network of the PLMN 1 can identify subscription information of the SIM card. Therefore, when the emergency call is made to the emergency call center through the core network of the PLMN 1, the emergency call center can identify a phone number of a user. If the user terminal selects the communication path b or c to communicate with the emergency call center, because the SIM card used in the user terminal is not a home card of the operator 2 or the operator 3, the core networks of the PLMN 2 and the PLMN 3 do not have subscription information of the SIM card, and consequently the emergency call center cannot identify the phone number of the user. When the user terminal is used to make the emergency call, if the user terminal selects the communication path b or c to communicate with the emergency call center, because the phone number of the user cannot be obtained, rescue is greatly hindered, for example, a rescue team cannot call back a to-be-rescued user.

Therefore, how to enable the emergency call center to successfully obtain the phone number of the to-be-rescued user is an urgent problem to be resolved currently.

SUMMARY

Embodiments of the present invention disclose an emergency call method and a user terminal, so that an emergency call center can successfully obtain a phone number of a to-be-rescued user.

According to a first aspect, an embodiment of this application provides an emergency call method. The method includes: obtaining PLMN information from a subscriber identification module SIM card of a user terminal, where the PLMN information includes a home public land mobile network (HPLMN) and an equivalent home public land mobile network (EHPLMN); receiving an emergency call operation of a user; receiving, in response to the emergency call operation of the user, a PLMN list that is broadcast by an access network device, where the access network device is an access network device in a multi-operator core network MOCN, and the PLMN list includes a plurality of PLMNs that share the access network device; when the PLMN list includes the HPLMN or the EHPLMN, determining that the HPLMN or the EHPLMN in the PLMN list is an optimal PLMN; and making an emergency call through a core network of the optimal PLMN. Specifically, after the PLMN list that is broadcast by the access network device is received, the user terminal may determine whether the PLMN list includes the HPLMN or the EHPLMN; and when the PLMN list includes the HPLMN or the EHPLMN, is the user terminal determines that the HPLMN or the EHPLMN in the PLMN list is the optimal PLMN.

A PLMN that is in the PLMN list and that is most closely associated with the SIM card of the user terminal is the HPLMN or the EHPLMN. Core networks of the HPLMN and the EHPLMN each have subscription information of the SIM card of the user terminal. The subscription information of the SIM card may include information such as a phone number of the SIM card. Therefore, when an emergency call is made through the core network of the HPLMN or the EHPLMN, the core network of the HPLMN or the EHPLMN can notify an emergency call center of the phone number of the SIM card, so that the emergency call center can successfully obtain the phone number of the user terminal. It can be learned that according to the method described in the first aspect, the emergency call center can successfully obtain the phone number of the user terminal.

In an embodiment, after the PLMN information is obtained from the subscriber identification module SIM card of the user terminal, the PLMN information may be further stored in a memory of the user terminal, so that the user terminal can subsequently obtain the HPLMN or the EHPLMN more quickly.

In an embodiment, after receiving the emergency call operation of the user, the user terminal may obtain location information of the user terminal. The user terminal may further send the location information of the user terminal to the emergency call center through the core network of the optimal PLMN. Based on this optional implementation, the emergency call center can successfully obtain the phone number of the user terminal, and the user terminal can successfully send the location information of the user terminal to the emergency call center.

In an embodiment, after receiving the emergency call operation of the user, the user terminal may further obtain user personal information, and send the user personal information to the emergency call center through the core network of the optimal PLMN. There is a correspondence between an emergency call type and user personal information. The user terminal may obtain corresponding user personal information based on an emergency call type. After obtaining the user personal information based on the type of the emergency call, the user terminal may further display the obtained user personal information. The user may further modify the displayed user personal information. After the modification is complete, the user may tap a sending instruction, so that the user terminal sends the user personal information to the emergency call center through the core network of the optimal PLMN. Alternatively, the user may not modify the displayed user personal information. After the user terminal displays the obtained user personal information, the user may directly tap a send button. After receiving a sending instruction, the user terminal sends the user personal information to the emergency call center through the core network of the optimal PLMN. After the user terminal displays the obtained user personal information, the user may alternatively tap a cancel button. After receiving a sending cancel instruction, the user terminal does not send the user personal information to the emergency call center. In this optional manner, the user may preset user personal information corresponding to different emergency call types, so that the user personal information can be sent to the emergency call center in a timely manner during an emergency call, to increase a rescue success rate.

In an embodiment, after the user terminal makes an emergency call through a core network of the HPLMN or the EHPLMN, if the user terminal detects that the emergency call fails, the user terminal may determine whether the PLMN list includes an EPLMN, and if the PLMN list includes the EPLMN, the user terminal makes the emergency call again through a core network of the EPLMN. In this optional manner, if the emergency call made through the core network of the HPLMN or the EHPLMN fails, the user terminal can automatically make the emergency call again through the core network of the EPLMN without a need of performing the emergency call operation again by the user. In actual application, signal quality of the HPLMN or the EHPLMN may be poor, and consequently the emergency call may fail. Therefore, when the emergency call made through the HPLMN or the EHPLMN fails, the user terminal selects a core network of another PLMN to make the emergency call again. This helps increase a success rate of making the emergency call.

In an embodiment, if duration of the emergency call reaches preset duration or a quantity of emergency call failure times reaches a preset quantity of times, the user terminal prompts the user that the call fails.

In an embodiment, when the PLMN list does not include the HPLMN or the EHPLMN, but the PLMN list includes an equivalent public land mobile network EPLMN, the user terminal determines that the EPLMN in the PLMN list is an optimal PLMN. Specifically, when the PLMN list does not include the HPLMN or the EHPLMN, the user terminal may determine whether the PLMN list includes the EPLMN; and when the PLMN list includes the EPLMN, the user terminal determines that the EPLMN in the PLMN list is the optimal PLMN. When the PLMN list does not include the HPLMN or the EHPLMN, the EPLMN in the PLMN list is a PLMN that is most closely associated with the SIM card of the user terminal. Therefore, based on this optional implementation, the emergency call center can successfully obtain the phone number of the user terminal.

In an embodiment, before the user terminal receives an emergency call instruction, the user terminal may receive an EPLMN list. The user terminal may store the EPLMN in the memory, or store the EPLMN in another place.

In an embodiment, if the PLMN list includes a plurality of EPLMNs, the user terminal may determine that an EPLMN with best signal quality in the plurality of EPLMNs is an optimal PLMN, or the user terminal may determine that an EPLMN used by the user most frequently in the plurality of EPLMNs is an optimal PLMN. Alternatively, a selection priority of each EPLMN during an emergency call may be preset. In this case, the user terminal selects one EPLMN from the plurality of EPLMNs based on the preset selection priority of each EPLMN to make an emergency call.

In an embodiment, after the user terminal makes an emergency call through a core network of the EPLMN, if the user terminal detects that the emergency call fails, the user terminal may determine whether the PLMN list includes a UPLMN; and if the PLMN list includes the UPLMN, the user terminal makes the emergency call again through a core network of the UPLMN. In this optional manner, if the emergency call made through the core network of the EPLMN fails, the user terminal can automatically make the emergency call again through the core network of the UPLMN without a need of performing the emergency call operation again by the user. In actual application, signal quality of the EPLMN may be poor, and consequently the emergency call may fail. Therefore, when the emergency call made through the EPLMN fails, the user terminal may make the emergency call again through a core network of another PLMN. This helps increase a success rate of making the emergency call.

In an embodiment, when the PLMN list does not include the HPLMN, the EHPLMN, or the EPLMN, but the PLMN list includes a user controlled public land mobile network UPLMN, the user terminal determines that the UPLMN in the PLMN list is an optimal PLMN. Specifically, when the PLMN list does not include the HPLMN, the EHPLMN, or the EPLMN, the user terminal may determine whether the PLMN list includes the UPLMN; and when the PLMN list includes the UPLMN, the user terminal determines that the EPLMN in the PLMN list is the optimal PLMN. When the PLMN list does not include the HPLMN, the EHPLMN, or the EPLMN, the UPLMN in the PLMN list is a PLMN that is most closely associated with the SIM card of the user terminal. Therefore, when the user terminal selects a core network of the UPLMN to make an emergency call, the emergency call center can also successfully obtain the phone number of the user terminal.

In an embodiment, the PLMN information obtained by the user terminal may further include the UPLMN.

In an embodiment, if the PLMN list includes a plurality of UPLMNs, the user terminal may determine that a UPLMN with best signal quality in the plurality of UPLMNs is an optimal PLMN, or the user terminal may determine that a UPLMN used by the user most frequently in the plurality of UPLMNs is an optimal PLMN. Alternatively, a selection priority of each UPLMN during an emergency call may be preset. In this case, the user terminal selects one UPLMN from the plurality of UPLMNs based on the preset selection priority of each UPLMN to make an emergency call.

In an embodiment, after the user terminal makes an emergency call through a core network of the UPLMN, if the user terminal detects that the emergency call fails, the user terminal may determine whether the PLMN list includes an OPLMN; and if the PLMN list includes the OPLMN, the user terminal makes the emergency call again through a core network of the OPLMN. In this optional manner, if the emergency call made through the core network of the OPLMN fails, the user terminal can automatically make the emergency call again through the core network of the OPLMN without a need of performing the emergency call operation again by the user. In actual application, signal quality of the UPLMN may be poor, and consequently the emergency call may fail. Therefore, when the emergency call made through the UPLMN fails, the user terminal may make the emergency call again through a core network of another PLMN. This helps increase a success rate of making the emergency call.

In an embodiment, when the PLMN list does not include the HPLMN, the EHPLMN, the EPLMN, or the UPLMN, but the PLMN list includes an operator controlled public land mobile network OPLMN, the user terminal determines that the OPLMN in the PLMN list is an optimal PLMN. Specifically, when the PLMN list does not include the HPLMN, the EHPLMN, the EPLMN, or the UPLMN, the user terminal may determine whether the PLMN list includes the OPLMN; and when the PLMN list includes the OPLMN, the user terminal determines that the OPLMN in the PLMN list is the optimal PLMN. When the PLMN list does not include the HPLMN, the EHPLMN, the EPLMN, or the UPLMN, the OPLMN in the PLMN list is a PLMN that is most closely associated with the SIM card of the user terminal. Therefore, when the user terminal selects a core network of the OPLMN to make an emergency call, the emergency call center can also successfully obtain the phone number of the user terminal.

In an embodiment, the PLMN information obtained by the user terminal may further include the OPLMN.

In an embodiment, if the PLMN list includes a plurality of OPLMNs, the user terminal may determine that an OPLMN with best signal quality in the plurality of OPLMNs is an optimal PLMN, or the user terminal may determine that an emergency call is made through a core network of an OPLMN used by the user most frequently in the plurality of OPLMNs. Alternatively, a selection priority of each OPLMN during an emergency call may be preset. In this case, the user terminal selects one OPLMN from the plurality of OPLMNs based on the preset selection priority of each OPLMN to make an emergency call.

In an embodiment, when the PLMN list does not include the HPLMN, the EHPLMN, the EPLMN, the EPLMN, the UPLMN, or the OPLMN, the user terminal determines that a PLMN with best signal quality in the PLMN list is an optimal PLMN. Specifically, when the PLMN list does not include the HPLMN, the EHPLMN, the EPLMN, or the UPLMN, the user terminal may determine whether the PLMN list includes the OPLMN; and when the PLMN list does not include the OPLMN, the user terminal determines that the PLMN with the best signal quality in the PLMN list is the optimal PLMN.

In an embodiment, the user terminal outputs prompt information if the user terminal determines that the PLMN with the best signal quality in the PLMN list is the optimal PLMN, where the prompt information is used to prompt that the emergency call center may fail to obtain a phone number of a calling user. In this manner, the user can learn whether the emergency call center can successfully obtain the phone number of the calling user, to notify the emergency call center of the phone number of the calling user in another manner. For example, the user can notify the emergency call center of the phone number orally when the emergency call center answers the call.

In an embodiment, after receiving the emergency call operation and the PLMN list, the user terminal may determine the optimal PLMN from the PLMN list based on the following priority sequence of the optimal PLMNs. The priority sequence of the optimal PLMNs may be: the HPLMN or the EHPLMN>the EPLMN>the UPLMN>the OPLMN>the PLMN with the best signal quality. To be specific, the user terminal first determines whether the PLMN list includes the HPLMN or the EHPLMN. If the PLMN list includes the HPLMN or the EHPLMN, the user terminal determines that the HPLMN or the EHPLMN is the optimal PLMN. If the user terminal determines that the PLMN list does not include the HPLMN or the EHPLMN, the user terminal determines whether the PLMN list includes the EPLMN. If the PLMN list includes the EPLMN, the user terminal determines that the EPLMN is the optimal PLMN. If the user terminal determines that the PLMN list does not include the EPLMN, the user terminal determines whether the PLMN list includes the UPLMN. If the PLMN list includes the UPLMN, the user terminal determines that the UPLMN is the optimal PLMN. If the PLMN list does not include the UPLMN, the user terminal determines whether the PLMN list includes the OPLMN. If the PLMN list includes the OPLMN, the user terminal determines that the OPLMN is the optimal PLMN. If the PLMN list does not include the OPLMN, the user terminal determines that the PLMN with the best signal quality in the PLMN list is the optimal PLMN. The optimal PLMN is determined based on the priority sequence, to help increase a success rate of obtaining the phone number of the user terminal by the emergency call center.

According to a second aspect, a user terminal is provided. The user terminal may perform the method described in the first aspect or the possible implementations of the first aspect. The function may be implemented by hardware, or may be implemented by hardware by executing corresponding software. The hardware or the software includes one or more units corresponding to the foregoing function. The unit may be software and/or hardware. Based on a same inventive concept, for problem-resolving principles and beneficial effects of the user terminal, refer to the principles and the beneficial effects achieved in the first aspect or the embodiments of the first aspect. Details are not described again.

According to a third aspect, a user terminal is provided. The user terminal includes a processor, a memory, and a communications interface, and the processor is connected to the memory and the communications interface. The memory is configured to store instructions. The communications interface is configured to communicate with another device. The processor is configured to execute the instructions in the memory, so that the user terminal performs the method described in the first aspect or the embodiments of the first aspect. For problem-resolving implementations and beneficial effects of the user terminal, refer to the principles and the beneficial effects achieved in the first aspect or the embodiments of the first aspect. Details are not described again.

According to a fourth aspect, a computer program product is provided. When the computer program product runs on a computer, the computer is enabled to perform the method described in the first aspect or the embodiments of the first aspect.

According to a fifth aspect, a chip system is provided. The chip system includes a processor and an interface circuit. The interface circuit is coupled to the processor. The processor is configured to execute a computer program or instructions, to implement the method according to the first aspect or the embodiments of the first aspect. The interface circuit is configured to communicate with another module outside the chip system.

According to a sixth aspect, a computer readable storage medium is provided. The computer readable storage medium stores instructions, and when the instructions are run on a computer, the computer is enabled to perform the method described in the first aspect or the embodiments of the first aspect.

BRIEF DESCRIPTION OF DRAWINGS

To describe the technical solutions in the embodiments of the present invention more clearly, the following briefly describes the accompanying drawings required for describing the embodiments. It is clear that the accompanying drawings in the following descriptions show merely some embodiments of the present invention, and persons of ordinary skill in the art may still derive other drawings from these accompanying drawings without creative efforts.

DESCRIPTION OF EMBODIMENTS

Figure 1:
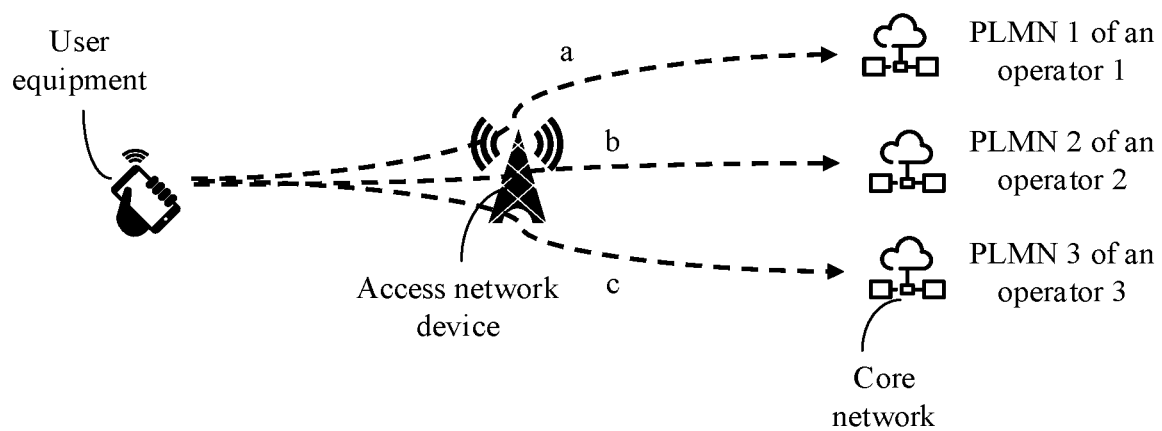
FIG. 1 is a schematic diagram of an existing emergency call according to an embodiment of the present invention.

To make the objectives, technical solutions, and advantages of the present invention clearer, the following describes the technical solutions of the embodiments of the present invention with reference to the accompanying drawings.

To enable an emergency call center to successfully obtain a phone number of a to-be-rescued user, the embodiments of this application provide an emergency call method and a user terminal.

To facilitate understanding of the embodiments of the present invention, the following first describes technical terms used in implementations of the present invention.

Public land mobile network (PLMN): The public land mobile network is a network established and operated by the government or an operator authorized by the government to provide land mobile communication services for the public. The PLMN includes a mobile country code (MCC) and a mobile network code (MNC). For example, a PLMN of China Mobile is 46000, where 460 represents the MCC and 00 represents the MNC.

Home public land mobile network (HPLMN): The home public land mobile network is a PLMN to which a terminal user belongs. To be specific, a mobile country code (MCC) and a mobile network code (MNC) that are included in an international mobile subscriber identity (IMSI) on a universal subscriber identity module (USIM) card of the user terminal are consistent with an MCC and an MNC in the HPLMN. A user has only one HPLMN.

Equivalent home public land mobile network (EHPLMN): The equivalent home public land mobile network is a PLMN equivalent to a home PLMN currently selected by a user terminal. An operator corresponding to the HPLMN may have different PLMNs. For example, China Mobile has three PLMNs: a PLMN (46000), a PLMN (46002), and a PLMN (46007). The PLMN (46002) and the PLMN (46007) are EHPLMNs relative to the PLMN (46000). The operator can write the EHPLMNs into a SIM card before delivery of the SIM card.

Equivalent PLMN (EPLMN): The equivalent PLMN is a PLMN equivalent to a PLMN currently selected by a user terminal, and has a same priority as the PLMN. The EPLMN is mainly used to implement camping and roaming policies of users in a shared network and an original network. An operator can configure EPLMN networks, and communication network resources can be shared between the networks. From a service perspective, network resources of different operators can be shared or communication network resources can be shared between different PLMNs defined by a same operator.

For example, a PLMN (46000) of China Mobile covers Shenzhen, and a PLMN (46001) of China Unicom covers Hong Kong. China Mobile and China Unicom may pre-agree on that the PLMN (46000) and the PLMN (46001) are EPLMNs of each other and the PLMN (46000) and the PLMN (46001) are equivalent to each other. The PLMN (46000) and the PLMN (46001) share subscription information of a user. If a user terminal registers with the PLMN (46000) in Shenzhen, after the registration succeeds, the user terminal may receive an EPLMN list sent by a core network of the PLMN (46000), where the EPLMN list includes the PLMN (46001). When the user terminal enters Hong Kong from Shenzhen, because the PLMN (46001) is an EPLMN of the PLMN (46000), the user terminal may register with the PLMN (46001) in Hong Kong for communication.

User controlled public land mobile network (UPLMN): The user controlled public land mobile network is a parameter that is stored on a USIM card and that is related to PLMN selection.

Operator controlled public land mobile network (OPLMN): The operator controlled public land mobile network is a parameter that is stored on a USIM card and that is related to PLMN selection.

To better understand the embodiments of this application, the following describes a system architecture to which the embodiments of this application are applicable.

Figure 2:
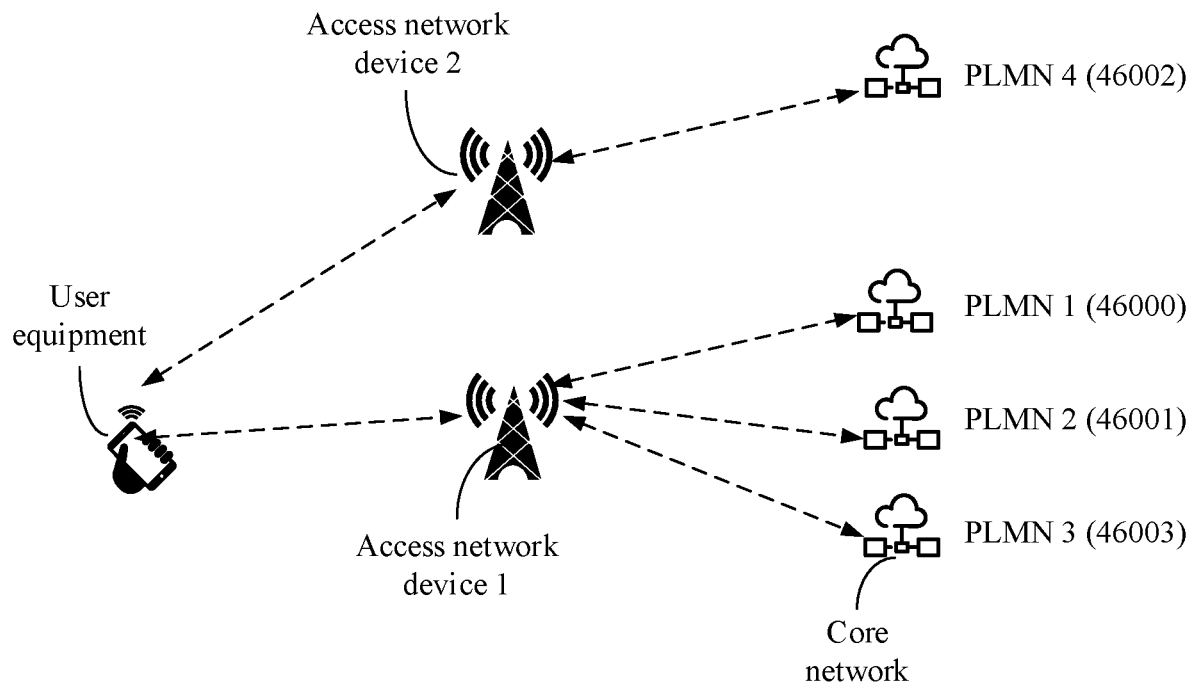
FIG. 2 is a schematic diagram of a system architecture according to an embodiment of the present invention.

FIG. 2 is a schematic diagram of a system architecture according to an embodiment of this application. As shown in FIG. 2, the system architecture includes a user terminal, an access network device 1, and core networks of at least two PLMNs that share the access network device 1. In FIG. 2, for example, a PLMN 1 (46000), a PLMN 2 (46001), and a PLMN 3 (46003) share an access network device. Certainly, in actual application, other PLMNs may share the access network device, or two or more PLMNs may share the access network device. To be specific, a network including the user terminal, the access network device 1, a core network of the PLMN 1 (46000), a core network of the PLMN 2 (46001), and a core network of the PLMN 3 (46003) that are shown in FIG. 2 is an MOCN network.

As shown in FIG. 2, the system architecture further includes an access network device 2. In FIG. 2, for example, the access network device 2 is connected to a core network of a PLMN 4 (46002). It should be noted that a wireless communications technology used by the access network device 2 is different from a wireless communications technology used by the access network device 1, and the wireless communications technology used by the access network device 2 does not support a voice call service.

For example, if a 4G network does not support a voice call service, but a 3G/2G network can support the voice call service, in this scenario, the wireless communications technology used by the access network device 2 may be a 4G wireless communications technology, and the wireless communications technology used by the access network device 1 may be a 3G/2G wireless communications technology. If a 5G network does not support a voice call service, but a 4G/3G/2G network can support the voice call service, in this scenario, the wireless communications technology used by the access network device 2 may be a 5G wireless communications technology, and the wireless communications technology used by the access network device 1 may be a 4G/3G/2G wireless communications technology.

If a network with which the user terminal currently registers does not support a voice call service, when the user terminal makes a call or has an incoming call, the user terminal automatically disconnects the currently registered network, and falls back to a network that can support the voice call service to complete the voice call. For example, if the access network device 2 in FIG. 2 uses a 4G wireless communications technology, and the access network device 1 uses a 3G wireless communications technology, the 4G wireless communications technology does not support a voice call service. If the user terminal has registered with the PLMN 4 (46002), after the user terminal receives an emergency call operation of a user, the user terminal needs to first disconnect the PLMN 4 (46002) of a 4G network, re-register with a PLMN of a 3G network, and then make an emergency call through a core network of the re-registered PLMN. In existing actual application, after receiving an emergency call operation, the user terminal randomly selects a PLMN in an MOCN network to make an emergency call. Because a core network of the randomly selected PLMN may not have subscription information of a SIM card of the user, when the emergency call is made through the core network of the randomly selected PLMN, an emergency call center may fail to obtain a phone number of a to-be-rescued user. However, in this embodiment of this application, after receiving the emergency call operation, the user terminal may select a core network of a PLMN that is in the MOCN network and that is most closely associated with the SIM card of the user terminal to make an emergency call. The core network of the PLMN that is in the MOCN network and that is most closely associated with the SIM card of the user terminal usually has subscription information of the SIM card of the user. Therefore, in this embodiment of this application, the emergency call center can successfully obtain the phone number of the to-be-rescued user.

The access network device may provide communication coverage for a specific geographical area, and may communicate with a terminal device located within the coverage area. The access network device may support communication protocols of different standards, or may support different communication modes. For example, the access network device may be an evolved NodeB (eNB or eNodeB) in an LTE system or a radio network controller in a cloud radio access network (CRAN), may be an access network device in a 5th generation (5G) network, for example, a new generation NodeB (gNodeB), may be a small cell, a micro cell, or a transmission reception point (TRP), or may be a relay station, an access point, or an access network device in a future evolved PLMN.

The user terminal may be an access terminal, user equipment (UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the internet of things, a virtual reality device, a terminal device in a future 5G network, a terminal device in a future evolved public land mobile network (PLMN), or the like.

To better understand the embodiments of this application, the following describes a structure of the user terminal in the embodiments of this application.

FIG. 1 is a schematic structural diagram of a user terminal 1300. The user terminal 1300 may include a processor 1310, an external memory interface 1320, an internal memory 1321, a universal serial bus (USB) interface 1330, a charging management module 1340, a power management module 1341, a battery 1342, an antenna 1, an antenna 2, a mobile communications module 1350, a wireless communications module 1360, an audio module 1370, a speaker 1370A, a receiver 1370B, a microphone 1370C, a headset jack 1370D, a sensor module 1380, a button 1390, a motor 1391, an indicator 1392, a camera 1393, a display 1394, a subscriber identification module (SIM) card interface 1395, and the like. The sensor module 1380 may include a pressure sensor 1380A, a gyro sensor 1380B, a barometric pressure sensor 1380C, a magnetic sensor 1380D, an acceleration sensor 1380E, a distance sensor 1380F, an optical proximity sensor 1380G, a fingerprint sensor 1380H, a temperature sensor 1380J, a touch sensor 1380K, an ambient light sensor 1380L, a bone conduction sensor 1380M, and the like.

It may be understood that a structure shown in the embodiments of the present invention does not constitute a limitation on the user terminal 1300. In some other embodiments of this application, the user terminal 1300 may include more or fewer components than those shown in the figure, or combine some components, or split some components, or have different component arrangements. The components shown in the figure may be implemented by hardware, software, or a combination of software and hardware.

The processor 1310 may include one or more processing units. For example, the processor 1310 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 1310, and is configured to store an instruction and data. In some embodiments, the memory in the processor 1310 is a cache memory. The memory may store an instruction or data that is just used or cyclically used by the processor 1310. If the processor 1310 needs to use the instruction or the data again, the processor 1310 may directly invoke the instruction or the data from the memory. This avoids repeated access and reduces a waiting time of the processor 1310, thereby improving system efficiency.

In some embodiments, the processor 1310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 1310 may include a plurality of groups of I2C buses. The processor 1310 may be separately coupled to the touch sensor 1380K, a charger, a flash, the camera 1393, and the like through different I2C bus interfaces. For example, the processor 1310 may be coupled to the touch sensor 1380K through the I2C interface, so that the processor 1310 communicates with the touch sensor 1380K through the I2C bus interface, to implement a touch function of the user terminal 1300.

The I2S interface may be configured to perform audio communication. In some embodiments, the processor 1310 may include a plurality of groups of I2S buses. The processor 1310 may be coupled to the audio module 1370 through the I2S bus, to implement communication between the processor 1310 and the audio module 1370. In some embodiments, the audio module 1370 may transmit an audio signal to the wireless communications module 1360 through the I2S interface, to implement a function of answering a call by using a Bluetooth headset.

The PCM interface may also be configured to: perform audio communication, and sample, quantize, and code an analog signal. In some embodiments, the audio module 1370 may be coupled to the wireless communications module 1360 through a PCM bus interface. In some embodiments, the audio module 1370 may alternatively transmit an audio signal to the wireless communications module 1360 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 1310 to the wireless communications module 1360. For example, the processor 1310 communicates with a Bluetooth module in the wireless communications module 1360 through the UART interface, to implement a Bluetooth function. In some embodiments, the audio module 1370 may transmit an audio signal to the wireless communications module 1360 through the UART interface, to implement a function of playing music by using a Bluetooth headset.

The MIPI interface may be configured to connect the processor 1310 to peripheral devices such as the display screen 1394 and the camera 1393. The MIPI interface includes a camera serial interface (CSI), a display serial interface (DSI), and the like. In some embodiments, the processor 1310 communicates with the camera 1393 through the CSI interface, to implement a photographing function of the user terminal 1300. The processor 1310 communicates with the display 1394 through the DSI interface, to implement a display function of the user terminal 1300.

The GPIO interface may be configured through software. The GPIO interface may be configured as a control signal or a data signal. In some embodiments, the GPIO interface may be configured to connect the processor 1310 to the camera 1393, the display 1394, the wireless communications module 1360, the audio module 1370, the sensor module 1380, and the like. The GPIO interface may alternatively be configured as the I2C interface, the I2S interface, the UART interface, the MIPI interface, or the like.

The USB interface 1330 is an interface that conforms to a USB standard specification, and may be specifically a mini USB interface, a micro USB interface, a USB Type-C interface, or the like. The USB interface 1330 may be configured to connect to the charger to charge the user terminal 1300, or may be configured to transmit data between the user terminal 1300 and a peripheral device, or may be configured to connect to a headset to play audio by using the headset. The interface may alternatively be configured to connect to another user terminal such as an AR device.

It may be understood that an interface connection relationship between the modules shown in this embodiment of the present invention is merely an example for description, and does not constitute a limitation on the structure of the user terminal 1300. In some other embodiments of this application, the user terminal 1300 may alternatively use an interface connection manner different from that in the foregoing embodiment, or a combination of a plurality of interface connection manners.

The charging management module 1340 is configured to receive charging input from a charger. The charger may be a wireless charger or a wired charger. In some embodiments of wired charging, the charging management module 1340 may receive charging input from the wired charger through the USB interface 1330. In some embodiments of wireless charging, the charging management module 1340 may receive wireless charging input by using a wireless charging coil of the user terminal 1300. The charging management module 1340 may further supply power to the user terminal by using the power management module 1341 while charging the battery 1342.

The power management module 1341 is configured to connect to the battery 1342, the charging management module 1340, and the processor 1310. The power management module 1341 receives input of the battery 1342 and/or the charging management module 1340, and supplies power to the processor 1310, the internal memory 1321, the display 1394, the camera 1393, the wireless communications module 1360, and the like. The power management module 1341 may be further configured to monitor parameters such as a battery capacity, a battery cycle count, and a battery health status (electric leakage or impedance). In some other embodiments, the power management module 1341 may alternatively be disposed in the processor 1310. In some other embodiments, the power management module 1341 and the charging management module 1340 may alternatively be disposed in a same device.

A wireless communication function of the user terminal 1300 may be implemented through the antenna 1, the antenna 2, the mobile communications module 1350, the wireless communications module 1360, the modem processor, the baseband processor, and the like.

The antenna 1 and the antenna 2 are configured to: transmit and receive electromagnetic wave signals. Each antenna in the user terminal 1300 may be configured to cover one or more communications frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 1350 may provide a wireless communication solution that includes 2G/3G/4G/5G or the like and that is applied to the user terminal 1300. The mobile communications module 1350 may include at least one filter, a switch, a power amplifier, a low noise amplifier (LNA), and the like. The mobile communications module 1350 may receive an electromagnetic wave through the antenna 1, perform processing such as filtering or amplification on the received electromagnetic wave, and transmit a processed electromagnetic wave to the modem processor for demodulation. The mobile communications module 1350 may further amplify a signal modulated by the modem processor, and convert the signal into an electromagnetic wave for radiation by using the antenna 1. In some embodiments, at least some function modules of the mobile communications module 1350 may be disposed in the processor 1310. In some embodiments, at least some function modules of the mobile communications module 1350 and at least some modules of the processor 1310 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 1370A, the receiver 1370B, or the like), or displays an image or a video through the display 1394. In some embodiments, the modem processor may be an independent component. In some other embodiments, the modem processor may be independent of the processor 1310, and is disposed in a same component as the mobile communications module 1350 or another function module.

The wireless communications module 1360 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the user terminal 1300. The wireless communications module 1360 may be one or more components integrated into at least one communications processing module. The wireless communications module 1360 receives an electromagnetic wave through the antenna 2, performs frequency modulation and filtering processing on an electromagnetic wave signal, and sends a processed signal to the processor 1310. The wireless communications module 1360 may further receive a to-be-sent signal from the processor 1310, perform frequency modulation and amplification on the signal, and convert the signal into an electromagnetic wave for radiation through the antenna 2.

In some embodiments, the antenna 1 and the mobile communications module 1350 of the user terminal 1300 are coupled, and the antenna 2 and the wireless communications module 1360 of the user terminal 1300 are coupled, so that the user terminal 1300 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The user terminal 1300 implements a display function by using the GPU, the display 1394, the application processor, and the like. The GPU is a microprocessor for image processing, and connects the display 1394 to the application processor. The GPU is configured to: perform mathematical and geometric calculation, and render an image. The processor 1310 may include one or more GPUs that execute a program instruction to generate or change display information.

The display 1394 is configured to display an image, a video, and the like. The display 1394 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro OLED, quantum dot light emitting diodes (QLED), or the like. In some embodiments, the user terminal 1300 may include one or N displays 1394, where N is a positive integer greater than 1.

The user terminal 1300 can implement a photographing function by using the ISP, the camera 1393, the video codec, the GPU, the display 1394, the application processor, and the like.

The ISP is configured to process data fed back by the camera 1393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 1393.

The camera 1393 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the user terminal 1300 may include one or N cameras 1393, where N is a positive integer greater than 1.

The digital signal processor is configured to process a digital signal, and may process another digital signal in addition to the digital image signal. For example, when the user terminal 1300 selects a frequency, the digital signal processor is configured to perform Fourier transform on frequency energy and the like.

The video codec is configured to: compress or decompress a digital video. The user terminal 1300 may support one or more video codecs. In this way, the user terminal 1300 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, with reference to a transfer mode between human brain neurons, and may further continuously perform self-learning. Applications such as intelligent cognition of the user terminal 1300 may be implemented by using the NPU, for example, image recognition, facial recognition, voice recognition, and text understanding.

The external memory interface 1320 may be configured to connect to an external storage card, for example, a micro SD card, to extend a storage capability of the user terminal 1300. The external storage card communicates with the processor 1310 through the external memory interface 1320, to implement a data storage function. For example, files such as music and a video are stored in the external storage card.

The internal memory 1321 may be configured to store computer executable program code. The executable program code includes instructions. The internal memory 1321 may include a program storage area and a data storage area. The program storage area may store an operating system, an application required by at least one function (for example, a sound playing function or an image playing function), and the like. The data storage area may store data (for example, audio data or a phone book) created in a use process of the user terminal 1300, and the like. In addition, the internal memory 1321 may include a high-speed random access memory, and may further include a nonvolatile memory, for example, at least one magnetic disk storage device, a flash memory device, or a universal flash storage (UFS). The processor 1310 runs the instructions stored in the internal memory 1321 and/or the instructions stored in the memory disposed in the processor, to perform various function applications of the user terminal 1300 and data processing.

The user terminal 1300 can implement an audio function such as music playing or recording by using the audio module 1370, the speaker 1370A, the receiver 1370B, the microphone 1370C, the headset jack 1370D, the application processor, and the like.

The audio module 1370 is configured to convert digital audio information into an analog audio signal output, and is also configured to convert an analog audio input into a digital audio signal. The audio module 1370 may be further configured to: code and decode an audio signal. In some embodiments, the audio module 1370 may be disposed in the processor 1310, or some function modules in the audio module 1370 are disposed in the processor 1310.

The speaker 1370A, also referred to as a "horn", is configured to convert an audio electrical signal into a sound signal. The user terminal 1300 may be used to listen to music or answer a call in a hands-free mode over the speaker 1370A.

The receiver 1370B, also referred to as an "earpiece", is configured to convert an audio electrical signal into a sound signal. When a call is answered or voice information is received by using the user terminal 1300, the receiver 1370B may be put close to a human ear to listen to a voice.

The microphone 1370C, also referred to as a "mike" or a "microphone", is configured to convert a sound signal into an electrical signal. When making a call or sending voice information, a user may make a sound by moving a human mouth close to the microphone 1370C to input a sound signal to the microphone 1370C. At least one microphone 1370C may be disposed in the user terminal 1300. In some other embodiments, two microphones 1370C may be disposed in the user terminal 1300, to collect a sound signal and further implement a noise reduction function. In some other embodiments, three, four, or more microphones 1370C may alternatively be disposed in the user terminal 1300, to collect a sound signal, reduce noise, further identify a sound source, implement a directional recording function, and the like.

The headset jack 1370D is configured to connect to a wired headset. The headset jack 1370D may be the USB interface 1330, a 3.5 mm open mobile terminal platform (OMTP) standard interface, or a cellular telecommunications industry association of the USA (CTIA) standard interface.

The pressure sensor 1380A is configured to sense a pressure signal, and may convert the pressure signal into an electrical signal. In some embodiments, the pressure sensor 1380A may be disposed on the display 1394. There are many types of pressure sensors 1380A such as a resistive pressure sensor, an inductive pressure sensor, and a capacitive pressure sensor. The capacitive pressure sensor may include at least two parallel plates made of conductive materials. When a force is applied to the pressure sensor 1380A, capacitance between electrodes changes. The user terminal 1300 determines pressure intensity based on the change of the capacitance. When a touch operation is performed on the display 1394, the user terminal 1300 detects intensity of the touch operation based on the pressure sensor 1380A. The user terminal 1300 may also calculate a touch location based on a detection signal of the pressure sensor 1380A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 1380B may be configured to determine a movement posture of the user terminal 1300. In some embodiments, angular velocities of the user terminal 1300 around three axes (namely, x, y, and z axes) may be determined by using the gyro sensor 1380B. The gyro sensor 1380B may be configured to perform image stabilization during photographing. For example, when a shutter is pressed, the gyro sensor 1380B detects an angle at which the user terminal 1300 jitters, obtains, through calculation based on the angle, a distance for which a lens module needs to compensate, and allows a lens to cancel the jitter of the user terminal 1300 through reverse motion, to implement image stabilization. The gyro sensor 1380B may be further used in navigation and motion sensing game scenarios.

The barometric pressure sensor 1380C is configured to measure barometric pressure. In some embodiments, the user terminal 1300 calculates an altitude by using a value of the barometric pressure measured by the barometric pressure sensor 1380C, to assist in positioning and navigation.

The magnetic sensor 1380D includes a Hall sensor. The user terminal 1300 may detect opening and closing of a flip leather case by using the magnetic sensor 1380D. In some embodiments, when the user terminal 1300 is a clamshell phone, the user terminal 1300 may detect opening and closing of a flip cover based on the magnetic sensor 1380D. Further, a feature such as automatic unlocking upon opening of the flip cover is set based on a detected opening/closing state of the leather case or a detected opening/closing state of the flip cover.

The acceleration sensor 1380E may detect values of accelerations in all directions (usually three axes) of the user terminal 1300, and may detect magnitude and a direction of the gravity when the user terminal 1300 is still. The acceleration sensor 1380E may be further configured to identify a posture of the user terminal, and is applied to an application such as switching between a landscape mode and a portrait mode or a pedometer.

The distance sensor 1380F is configured to measure a distance. The user terminal 1300 may measure the distance in an infrared or a laser manner. In some embodiments, in a photographing scenario, the user terminal 1300 may measure a distance by using the distance sensor 1380F to implement quick focusing.

For example, the optical proximity sensor 1380G may include a light-emitting diode (LED) and an optical detector, for example, a photodiode. The light-emitting diode may be an infrared light-emitting diode. The user terminal 1300 emits infrared light by using the light-emitting diode. The user terminal 1300 detects infrared reflected light from a nearby object by using the photodiode. When sufficient reflected light is detected, the user terminal 1300 may determine that there is an object near the user terminal 1300. When insufficient reflected light is detected, the user terminal 1300 may determine that there is no object near the user terminal 1300. The user terminal 1300 may detect, by using the optical proximity sensor 1380G, that the user holds the user terminal 1300 close to an ear to make a call, so as to automatically turn off a screen for power saving. The optical proximity sensor 1380G may also be used in a leather case mode or a pocket mode to automatically unlock or lock the screen.

The ambient light sensor 1380L is configured to sense ambient light brightness. The user terminal 1300 may adaptively adjust brightness of the display 1394 based on the sensed ambient light brightness. The ambient light sensor 1380L may also be configured to automatically adjust white balance during photographing. The ambient light sensor 1380L may also cooperate with the optical proximity sensor 1380G to detect whether the user terminal 1300 is in a pocket to prevent an accidental touch.

The fingerprint sensor 1380H is configured to collect a fingerprint. The user terminal 1300 may use a feature of the collected fingerprint to implement fingerprint-based unlocking, application lock access, fingerprint-based photographing, fingerprint-based call answering, and the like.

The temperature sensor 1380J is configured to detect a temperature. In some embodiments, the user terminal 1300 executes a temperature processing policy by using the temperature detected by the temperature sensor 1380J. For example, when the temperature reported by the temperature sensor 1380J exceeds a threshold, the user terminal 1300 lowers performance of a processor near the temperature sensor 1380J, to reduce power consumption for thermal protection. In some other embodiments, when the temperature is less than another threshold, the user terminal 1300 heats the battery 1342 to prevent the user terminal 1300 from being shut down abnormally because of a low temperature. In some other embodiments, when the temperature is less than still another threshold, the user terminal 1300 boosts an output voltage of the battery 1342 to avoid abnormal shutdown caused by a low temperature.

The touch sensor 1380K is also referred to as a "touch component". The touch sensor 1380K may be disposed on the display 1394, and the touch sensor 1380K and the display 1394 form a touchscreen, which is also referred to as a "touchscreen". The touch sensor 1380K is configured to detect a touch operation performed on or near the touch sensor 1380K. The touch sensor may transfer the detected touch operation to the application processor, to determine a type of a touch event. Visual output related to the touch operation may be provided by using the display 1394. In some other embodiments, the touch sensor 1380K may alternatively be disposed on a surface of the user terminal 1300 at a location different from that of the display 1394.

The bone conduction sensor 1380M may obtain a vibration signal. In some embodiments, the bone conduction sensor 1380M may obtain a vibration signal of a vibration bone of a human vocal part. The bone conduction sensor 1380M may also be in contact with a human pulse, and receive a blood pressure beating signal. In some embodiments, the bone conduction sensor 1380M may alternatively be disposed in a headset to form a bone conduction headset. The audio module 1370 may obtain a voice signal through parsing based on the vibration signal that is of the vibration bone of the vocal part and that is obtained by the bone conduction sensor 1380M, to implement a voice function. The application processor may parse heart rate information based on the blood pressure beating signal obtained by the bone conduction sensor 1380M, to implement a heart rate detection function.

The button 1390 includes a power button, a volume button, and the like. The button 1390 may be a mechanical button, or may be a touch button. The user terminal 1300 may receive button input, and generate button signal input related to a user setting and function control of the user terminal 1300.

The motor 1391 may generate a vibration prompt. The motor 1391 may be used for an incoming call vibration prompt, or may be used for a touch vibration feedback. For example, touch operations performed on different applications (for example, photographing and audio playing) may correspond to different vibration feedback effects. The motor 1391 may also correspond to different vibration feedback effects for touch operations performed on different areas of the display 1394. Different application scenarios (for example, a time reminder, information receiving, an alarm clock, a game, and the like) may also correspond to different vibration feedback effects. A touch vibration feedback effect may be further customized.

The indicator 1392 may be an indicator light, and may be configured to indicate a charging status and a power change, or may be configured to indicate a message, a missed call, a notification, and the like.

The SIM card interface 1395 is configured to connect to a SIM card. The SIM card may be inserted into the SIM card interface 1395 or plugged from the SIM card interface 1395, to implement contact with or separation from the user terminal 1300. The user terminal 1300 may support one or N SIM card interfaces, where N is a positive integer greater than 1. The SIM card interface 1395 may support a nano-SIM card, a micro-SIM card, a SIM card, and the like. A plurality of cards may be inserted into a same SIM card interface 1395 at the same time. The plurality of cards may be of a same type or of different types. The SIM card interface 1395 may also be compatible with different types of SIM cards. The SIM card interface 1395 may also be compatible with the external storage card. The user terminal 1300 interacts with a network by using the SIM card, to implement a call function, a data communication function, and the like. In some embodiments, the user terminal 1300 uses an eSIM, namely, an embedded SIM card. The eSIM card may be embedded into the user terminal 1300, and cannot be separated from the user terminal 1300.

The following describes a software system of the user terminal 1300 in detail.

The software system of the user terminal 1300 may use a layered architecture, an event-driven architecture, a microkernel architecture, a micro service architecture, or a cloud architecture. In this embodiment of the present invention, an Android system with the layered architecture is used as an example to describe a software structure of the user terminal 1300.

Figure 14:
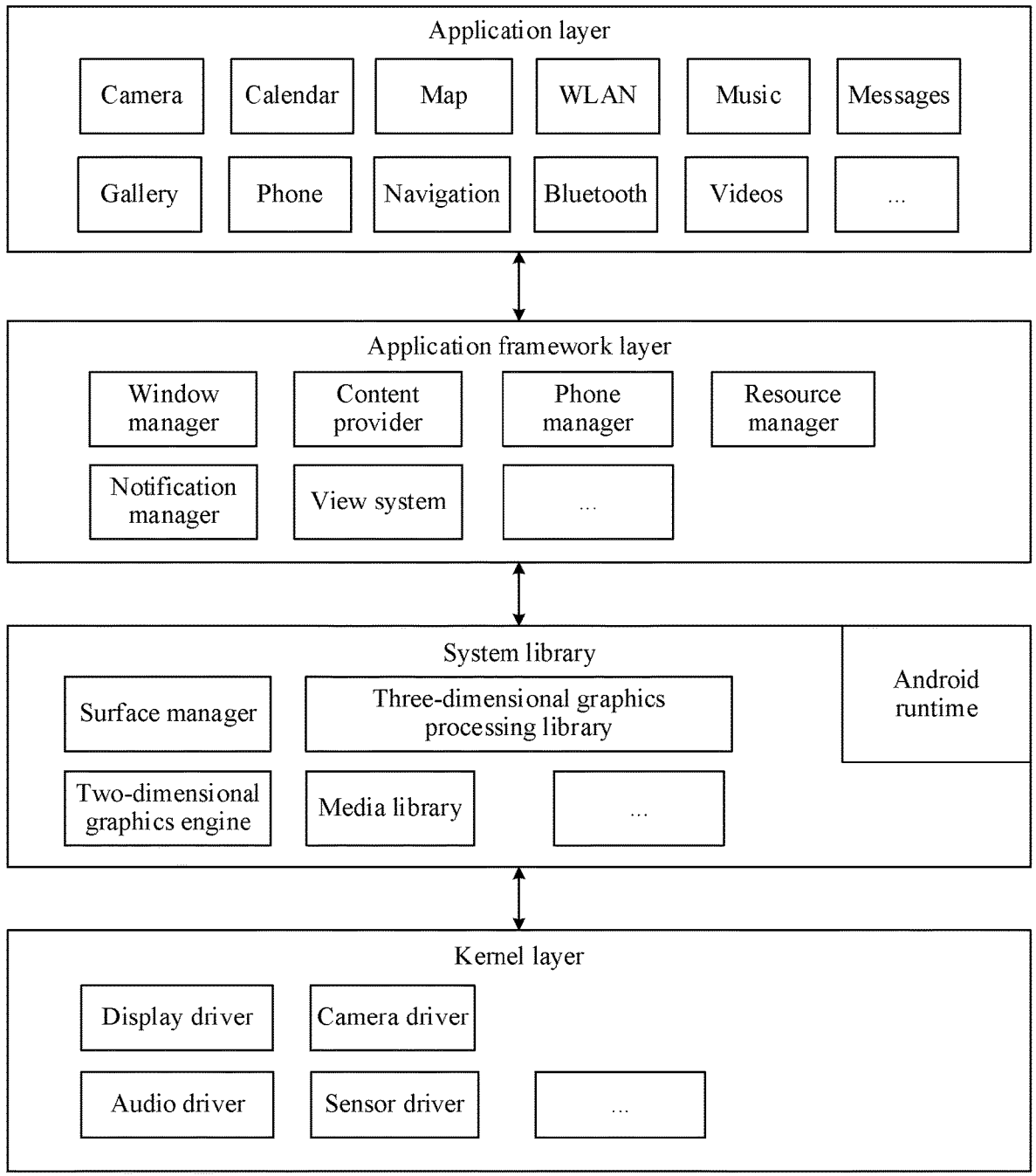
FIG. 14 is a schematic diagram of a software system of a user terminal according to an embodiment of the present invention.

FIG. 14 is a block diagram of a software structure of the user terminal 1300 according to an embodiment of the present invention. In a layered architecture, software is divided into several layers, and each layer has a clear role and task. The layers communicate with each other through a software interface. In some embodiments, the Android system is divided into four layers from top to bottom: an application layer, an application framework layer, an Android runtime and system library, and a kernel layer.

The application layer may include a series of application packages. As shown in FIG. 14, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions. As shown in FIG. 14, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the user terminal 1300, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification message. The notification manager may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running on a background or a notification that appears on the screen in a form of a dialog window. For example, text information is displayed in the status bar, an alert sound is played, the user terminal vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the user terminal 1300 with reference to a capture photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. A camera application invokes an interface at the application framework layer to enable the camera application, then enables a camera driver by invoking the kernel layer, and captures a static image or a video by using the camera 1393.

The following further describes how a user terminal selects a core network of a PLMN in an MOCN network after receiving an emergency call operation to make an emergency call.

Figure 3:
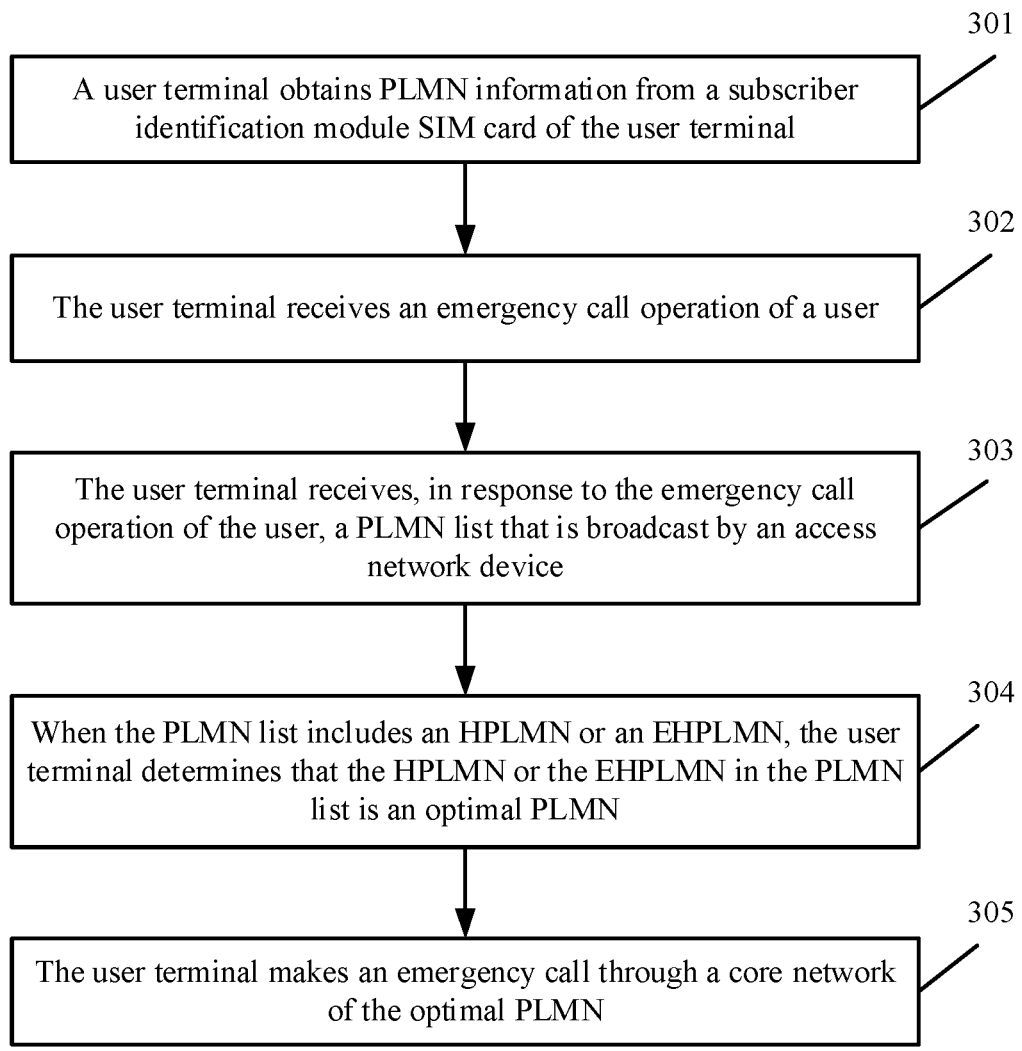
FIG. 3 is a schematic flowchart of an emergency call method according to an embodiment of the present invention.

FIG. 3 shows an emergency call method according to an embodiment of this application. As shown in FIG. 3, the emergency call method includes the following operations 301 to 305.

301: A user terminal obtains PLMN information from a subscriber identification module SIM card of the user terminal.

The PLMN information includes an HPLMN and an EHPLMN. For descriptions of the HPLMN and the EHPLMN, refer to the foregoing related descriptions. Details are not described herein again. For example, the user terminal may read the HPLMN and the EHPLMN from the SIM card after being powered on. In an embodiment, after obtaining the HPLMN and the EHPLMN, the user terminal may further store the read HPLMN and the read EHPLMN in a memory. The HPLMN and the EHPLMN are stored in the memory, so that the user terminal can subsequently obtain the HPLMN or the EHPLMN more quickly.

302: The user terminal receives an emergency call operation of a user.

An emergency call may be an emergency call for a fire alarm, an emergency call for a traffic accident, an emergency call for alarm help, an emergency call for medical help, or the like. A manner of the emergency call operation may be a manner of pressing a physical button of the user terminal, a manner of tapping a virtual button, or a voice control manner. For example, the user may first enter an emergency call number on the user terminal manually or in a voice manner, and then perform the emergency call operation on the user terminal, for example, press a physical dialing button, or tap a dialing button on a display, or indicate, through a voice, the user terminal to make a call.

303: The user terminal receives, in response to the emergency call operation of the user, a PLMN list that is broadcast by an access network device.

As described above, the access network device is an access network device in a multi-operator core network MOCN. The PLMN list that is broadcast by the access network device includes a plurality of PLMNs that share the access network device. For example, the access network device may be an access network device 1 in FIG. 2.

For example, as shown in FIG. 2, if a PLMN 1 (46000), a PLMN 2 (46001), and a PLMN 3 (46003) share the access network device 1, a PLMN list that is broadcast by the access network device 1 includes the PLMN 1 (46000), the PLMN 2 (46001), and the PLMN 3 (46003). The user terminal may receive, in response to the emergency call operation of the user, the PLMN list that is broadcast by the access network device 1.

In an embodiment, an implementation in which the user terminal receives the PLMN list that is broadcast by the access network device is as follows: The user terminal receives a system message that is broadcast by the access network device and that carries the PLMN list. For example, as shown in FIG. 2, if the user terminal has registered with a PLMN 4 (46002) of a 4G network, and the 4G network does not support a voice call service, after the user terminal receives the emergency call operation of the user, the user terminal needs to first disconnect the PLMN 4 (46002) of the 4G network, receive system messages that are of a plurality of cells and that are broadcast by the access network device 1, and then select, based on the system messages of the plurality of cells, a suitable cell served by the access network device 1 to camp on. A system message that is of each cell and that is broadcast by the access network device 1 includes a PLMN list. The PLMN list includes the PLMN 1 (46000), the PLMN 2 (46001), and the PLMN 3 (46003). After camping on a cell, the user terminal may determine an optimal PLMN from the received PLMN list, and send a registration request to the access network device 1. The access network device 1 sends the registration request to a core network of the optimal PLMN for registration. After the registration succeeds, the user terminal makes an emergency call through the core network of the optimal PLMN. Specifically, the user terminal sends an emergency call request to the core network of the optimal PLMN through the access network device 1, and makes the emergency call after the core network of the optimal PLMN receives the emergency call request.

304: When the PLMN list includes the HPLMN or the EHPLMN, the user terminal determines that the HPLMN or the EHPLMN in the PLMN list is an optimal PLMN.

305: The user terminal makes an emergency call through a core network of the optimal PLMN.

Figure 7:
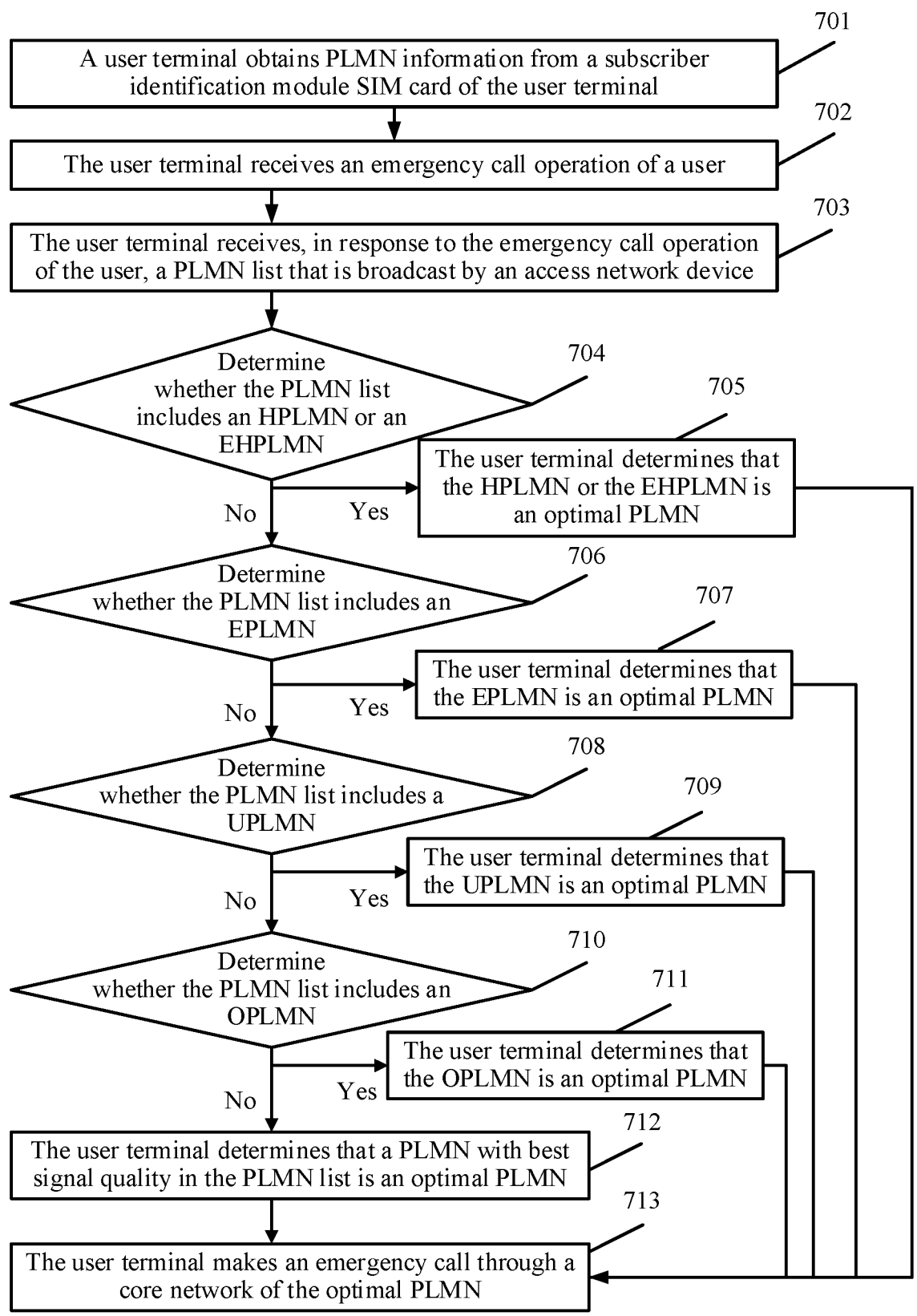
FIG. 7 is a schematic flowchart of still another emergency call method according to an embodiment of the present invention.

Specifically, after receiving the PLMN list, the user terminal may determine whether the PLMN list includes the HPLMN or the EHPLMN. When the PLMN list includes the HPLMN or the EHPLMN, the user terminal determines that the HPLMN or the EHPLMN is the optimal PLMN. When the PLMN list does not include the HPLMN or the EHPLMN, the procedure ends or another operation shown in FIG. 7 is performed. After determining the optimal PLMN, the user terminal sends a registration request to the access network device (for example, the access network device 1 in FIG. 2), and the access network device sends the registration request to the core network of the optimal PLMN for registration. After the registration succeeds, the user terminal sends an emergency call request to the core network of the optimal PLMN through the access network device, and makes the emergency call after the core network of the optimal PLMN receives the emergency call request.

Figure 4:
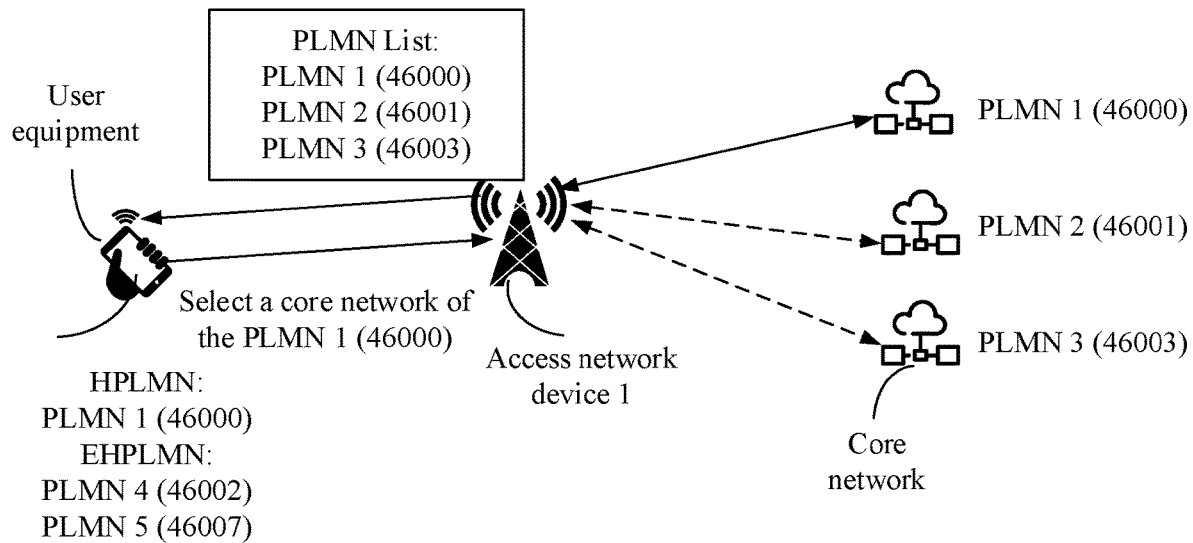
FIG. 4 is a schematic diagram of an emergency call according to an embodiment of the present invention.

For example, as shown in FIG. 4, if a PLMN 1 (46000), a PLMN 2 (46001), and a PLMN 3 (46003) share an access network device 1, a PLMN list received by the user terminal includes the PLMN 1 (46000), the PLMN 2 (46001), and the PLMN 3 (46003). In this case, an HPLMN of the user terminal is the PLMN 1 (46000), and EHPLMNs of the user terminal include a PLMN 4 (46002) and a PLMN 5 (46007). Because the PLMN list includes the HPLMN (namely, the PLMN 1), the user terminal determines that the PLMN 1 (46000) is an optimal PLMN, and the user terminal makes an emergency call through a core network of the PLMN 1 (46000).

Figure 5:
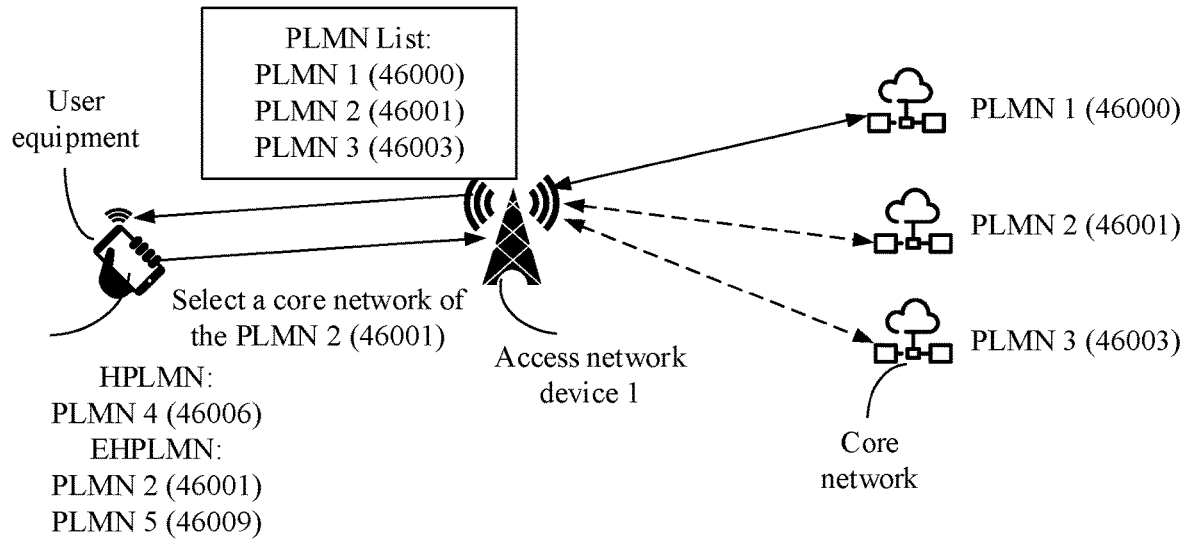
FIG. 5 is a schematic diagram of another emergency call according to an embodiment of the present invention.

For another example, as shown in FIG. 5, if a PLMN list received by the user terminal includes a PLMN 1 (46000), a PLMN 2 (46001), and a PLMN 3 (46003), an HPLMN of the user terminal is a PLMN 4 (46006), and EHPLMNs of the user terminal include the PLMN 2 (46001) and a PLMN 5 (46009). Because the PLMN list includes the EHPLMN (namely, the PLMN 2), the user terminal determines that the PLMN 2 (46001) is an optimal PLMN, and makes an emergency call through a core network of the PLMN 2 (46001).

A PLMN that is in the PLMN list and that is most closely associated with the SIM card of the user terminal is the HPLMN or the EHPLMN. Core networks of the HPLMN and the EHPLMN each have subscription information of the SIM card of the user terminal. The subscription information of the SIM card may include information such as a phone number of the SIM card. Therefore, when an emergency call is made through the core network of the HPLMN or the EHPLMN, the core network of the HPLMN or the EHPLMN can notify an emergency call center of the phone number of the SIM card, and the emergency call center can successfully obtain the phone number of the user terminal. According to the method described in FIG. 3, the emergency call center can successfully obtain the phone number of the user terminal.

Figure 6:
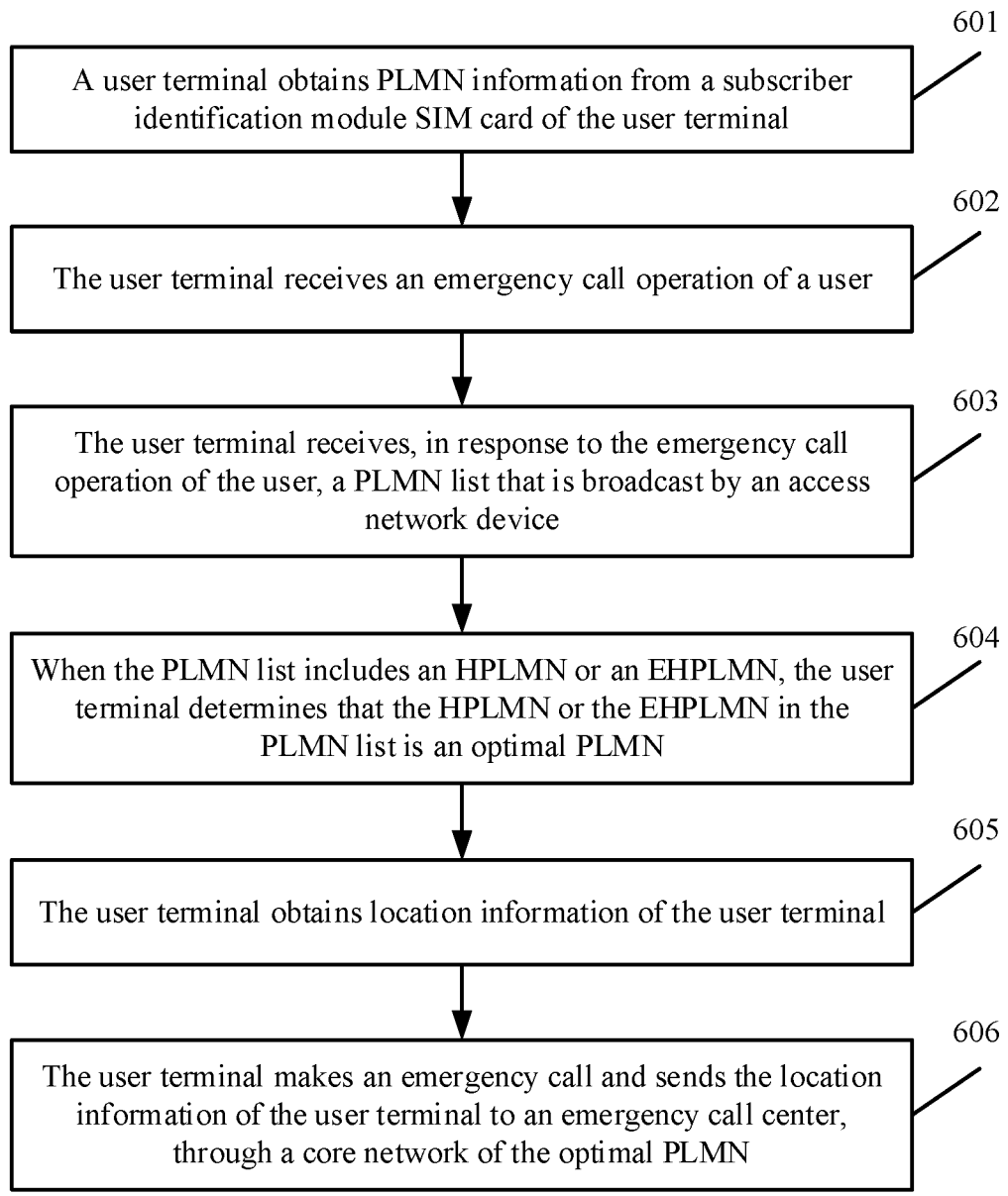
FIG. 6 is a schematic flowchart of another emergency call method according to an embodiment of the present invention.

In an optional implementation, as shown in FIG. 6, after receiving the emergency call operation, the user terminal may further obtain location information of the user terminal. After determining the optimal PLMN, the user terminal may further send the location information of the user terminal to the emergency call center through the core network of the optimal PLMN.

Specifically, after determining the optimal PLMN, the user terminal sends a registration request to the access network device (for example, the access network device 1 in FIG. 2), and the access network device sends the registration request to the core network of the optimal PLMN for registration. After the registration succeeds, the user terminal sends an emergency call request to the core network of the optimal PLMN through the access network device, and makes an emergency call after the core network of the optimal PLMN receives the emergency call request. After the registration succeeds, the user terminal may further send a location information sending request to the core network of the optimal PLMN through the access network device, where the location information sending request is used to request to send the location information of the user terminal to the emergency call center, and the location information sending request carries the location information of the user terminal. After receiving the location information sending request, the core network of the optimal PLMN sends the location information of the user terminal to the emergency call center.

Currently, increasingly more countries enable an advanced mobile location (advanced mobile location, AML) function. In a process in which the user makes an emergency call, this function enables the user terminal to automatically start a location service, and to send current location information of the user terminal to the emergency call center through a background SMS message. This function can greatly improve rescue efficiency and increase a possibility that a to-be-rescued person survives from a danger. If a core network of a PLMN with which the user terminal registers does not have the subscription information of the SIM card of the user terminal, and in an emergency call process, the user terminal selects the core network to make an emergency call and to send the location information of the user terminal to the emergency call center, the emergency call center cannot obtain the phone number of the user terminal, and the core network cannot send the location information of the user terminal to the emergency call center through an SMS message. Therefore, if the core network of the optimal PLMN is selected to make the emergency call and to send the current geographical location information of the user terminal to the emergency call center, the emergency call center can successfully obtain the phone number of the user terminal, and the user terminal can successfully send the location information of the user terminal to the emergency call center.

In an embodiment, after receiving the emergency call operation of the user, the user terminal may further obtain user personal information, and send the user personal information to the emergency call center through the core network of the optimal PLMN. Specifically, the user terminal may send a personal information sending request to the core network of the optimal PLMN through the access network device (for example, the access network device 1 in FIG. 2), where the personal information sending request is used to request to send the user personal information to the emergency call center, and the personal information sending request carries the user personal information. After receiving the personal information sending request, the core network of the optimal PLMN sends the user personal information to the emergency call center. There is a correspondence between an emergency call type and user personal information. The user terminal may obtain corresponding user personal information based on an emergency call type. For example, the user personal information may further include one or more of user identity information (such as a name, an age, and a home address), contact information of a family member, a medical history, and the like. The user may specify, in advance on the user terminal, that user personal information corresponding to an emergency call for a fire alarm includes a home address and contact information of a family member, user personal information corresponding to an emergency call for alarm help includes identity information (such as a name, an age, and a home address), contact information of a family member, and the like, and user personal information corresponding to an emergency call for medical help includes identity information, a medical history, and contact information of a family member. After obtaining the user personal information based on the emergency call type, the user terminal may further display the obtained user personal information. The user may further modify the displayed user personal information. After the modification is complete, the user may tap a sending instruction, so that the user terminal sends the user personal information to the emergency call center through the core network of the optimal PLMN. Alternatively, the user may not modify the displayed user personal information. After the user terminal displays the obtained user personal information, the user may directly tap a send button. After receiving a sending instruction, the user terminal sends the user personal information to the emergency call center through the core network of the optimal PLMN. Alternatively, after the user terminal displays the obtained user personal information, the user may tap a cancel button. After receiving a sending cancel instruction, the user terminal does not send the user personal information to the emergency call center. In this optional manner, the user may preset user personal information corresponding to different emergency call types, so that the user personal information can be sent to the emergency call center in a timely manner during an emergency call, to increase a rescue success rate.

FIG. 7 shows another emergency call method according to an embodiment of this application. As shown in FIG. 7, the emergency call method includes the following operations 701 to 712.

701: A user terminal obtains PLMN information from a subscriber identification module SIM card of the user terminal. The PLMN information includes an HPLMN and an EHPLMN.

In an embodiment, after obtaining the PLMN information, the user terminal may further store the PLMN information in a memory of the user terminal.

702: The user terminal receives an emergency call operation of a user.

703: The user terminal receives, in response to the emergency call operation of the user, a PLMN list that is broadcast by an access network device.

704: The user terminal determines whether the PLMN list includes the HPLMN or the EHPLMN. The user terminal performs operation 705 when the PLMN list includes the HPLMN or the EHPLMN, or the user terminal performs operation 706 when the PLMN list does not include the HPLMN or the EHPLMN.

705: The user terminal determines that the HPLMN or the EHPLMN in the PLMN list is an optimal PLMN.

For implementations of operation 701 to operation 705, refer to the implementations of operation 301 to operation 304. Details are not described herein again.

In an embodiment, after the user terminal makes an emergency call through a core network of the HPLMN or the EHPLMN, if the user terminal detects that the emergency call fails, the user terminal may determine whether the PLMN list includes an EPLMN, and if the PLMN list includes the EPLMN, the user terminal makes the emergency call again through a core network of the EPLMN. In this optional manner, if the emergency call made through the core network of the HPLMN or the EHPLMN fails, the user terminal can automatically make the emergency call again through the core network of the EPLMN without a need of performing the emergency call operation again by the user. In actual application, signal quality of the HPLMN or the EHPLMN may be poor, and consequently the emergency call may fail. Therefore, when the emergency call made through the HPLMN or the EHPLMN fails, the user terminal may make the emergency call again through a core network of another PLMN. This helps increase a success rate of making the emergency call.

In an embodiment, if duration of the emergency call reaches preset duration or a quantity of emergency call failure times reaches a preset quantity of times, the user terminal prompts the user that the call fails.

706: The user terminal determines whether the PLMN list includes the EPLMN. The user terminal performs operation 707 when the PLMN list includes the EPLMN, or the user terminal performs operation 708 when the PLMN list does not include the EPLMN. In other words, the user terminal performs operation 707 when the PLMN list does not include the HPLMN or the EHPLMN, but includes the EPLMN, or the user terminal performs operation 708 when the PLMN list does not include the HPLMN, the EHPLMN, or the EPLMN.

In this embodiment of this application, for descriptions of the EPLMN, refer to the foregoing related descriptions. Details are not described herein again. Before receiving an emergency call instruction, the user terminal may further receive an EPLMN list. After receiving the EPLMN list, the user terminal stores the EPLMN list, so that when subsequently receiving the emergency call instruction, the user terminal can obtain the stored EPLMN list, and determine whether the PLMN list includes the EPLMN in the EPLMN list. Specifically, after registering with a PLMN, the user terminal may receive an EPLMN list sent by a core network of the registered PLMN. For example, as shown in FIG. 2, after the user terminal registers with a PLMN 4, a core network of the PLMN 4 sends an EPLMN list to an access network device 2, where the EPLMN list includes a PLMN equivalent to the PLMN 4. After receiving the EPLMN list, the access network device 2 sends the EPLMN list to the user terminal. After receiving the EPLMN, the user terminal stores the EPLMN. The user terminal may store the EPLMN in the memory, or store the EPLMN in another place. This is not limited in this embodiment of this application.

Alternatively, when the PLMN list does not include the HPLMN or the EHPLMN, the user terminal may not determine whether the PLMN list includes the EPLMN, but the user terminal may determine, according to another rule, that a PLMN in the PLMN list is an optimal PLMN.

707: The user terminal determines that the EPLMN in the PLMN list is an optimal PLMN.

When the PLMN list does not include the HPLMN or the EHPLMN, the EPLMN in the PLMN list is a PLMN that is most closely associated with the SIM card of the user terminal. Therefore, when the user terminal makes an emergency call through a core network of the EPLMN, an emergency call center can also successfully obtain a phone number of the user terminal.

Figure 8:
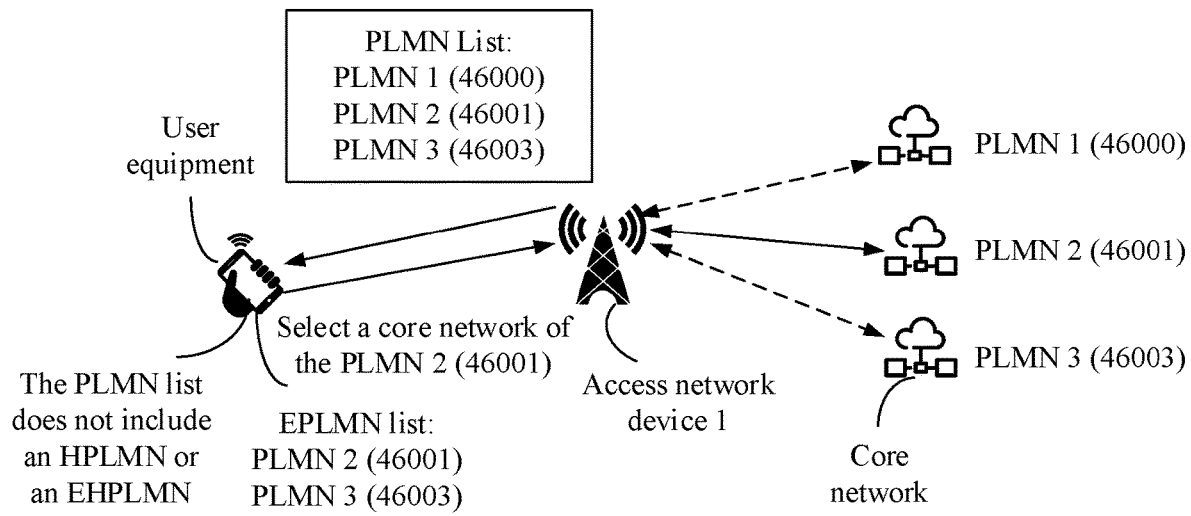
FIG. 8 is a schematic diagram of still another emergency call according to an embodiment of the present invention.

For example, as shown in FIG. 8, if the PLMN list received by the user terminal includes a PLMN 1 (46000), a PLMN 2 (46001), and a PLMN 3 (46003), but the PLMN list does not include the HPLMN or the EHPLMN, the user terminal determines whether the PLMN list includes the EPLMN. For example, if the EPLMN list includes the PLMN 2 (46001) and the PLMN 3 (46003), the user terminal determines that the PLMN list includes the EPLMN. In this case, the user terminal determines that the PLMN 2 (46001) or the PLMN 3 (46003) is an optimal PLMN, and the user terminal makes an emergency call through a core network of the PLMN 2 (46001) or the PLMN 3 (46003). In FIG. 8, for example, the user terminal makes the emergency call through the core network of the PLMN 2 (46001).

In an embodiment, if the PLMN list includes a plurality of EPLMNs, the user terminal may determine that an EPLMN with best signal quality in the plurality of EPLMNs is an optimal PLMN, or the user terminal may determine that an EPLMN used by the user most frequently in the plurality of EPLMNs is an optimal PLMN. Alternatively, a selection priority of each EPLMN during an emergency call may be preset. In this case, the user terminal selects one EPLMN from the plurality of EPLMNs based on the preset selection priority of each EPLMN to make an emergency call. For example, the EPLMN list includes the PLMN 2 (46001) and the PLMN 3 (46003). In this case, a selection priority of the PLMN 2 (46001) may be preset to be higher than a selection priority of the PLMN 3 (46003). If the PLMN list includes both the PLMN 2 (46001) and the PLMN 3 (46003), the user terminal can preferentially select a core network of the PLMN 2 to make an emergency call.

In an embodiment, after the user terminal makes an emergency call through the core network of the EPLMN, if the user terminal detects that the emergency call fails, the user terminal may determine whether the PLMN list includes a UPLMN, and if the PLMN list includes the UPLMN, the user terminal makes the emergency call again through a core network of the UPLMN. In this optional manner, if the emergency call made through the core network of the EPLMN fails, the user terminal can automatically make the emergency call again through the core network of the UPLMN without a need of performing the emergency call operation again by the user. In actual application, signal quality of the EPLMN may be poor, and consequently the emergency call may fail. Therefore, when the emergency call made through the EPLMN fails, the user terminal may make the emergency call again through a core network of another PLMN. This helps increase a success rate of making the emergency call.

708: The user terminal determines whether the PLMN list includes the UPLMN. The user terminal performs operation 709 when the PLMN list includes the UPLMN, or the user terminal performs operation 710 when the PLMN list does not include the UPLMN. In other words, the user terminal performs operation 709 when the PLMN list does not include the HPLMN, the EHPLMN, or the EPLMN, but includes the UPLMN, or the user terminal performs operation 710 when the PLMN list does not include the HPLMN, the EHPLMN, the EPLMN, or the UPLMN.

In this embodiment of this application, for descriptions of the UPLMN, refer to the foregoing related descriptions. Details are not described herein again. Alternatively, when the PLMN list does not include the EPLMN, the user terminal may not determine whether the PLMN list includes the UPLMN, but the user terminal may determine, according to another rule, that a PLMN in the PLMN list is an optimal PLMN.

In an embodiment, the PLMN information obtained by the user terminal in operation 701 may further include the UPLMN. After obtaining the PLMN information, the user terminal may store the PLMN information in the memory, to store the UPLMN in the memory, so that the user terminal can subsequently obtain the UPLMN more quickly.

709: The user terminal determines that the UPLMN in the PLMN list is an optimal PLMN.

When the PLMN list does not include the HPLMN, the EHPLMN, or the EPLMN, the UPLMN in the PLMN list is a PLMN that is most closely associated with the SIM card of the user terminal. Therefore, when the user terminal makes an emergency call through a core network of the UPLMN, the emergency call center can also successfully obtain the phone number of the user terminal.

Figure 9:
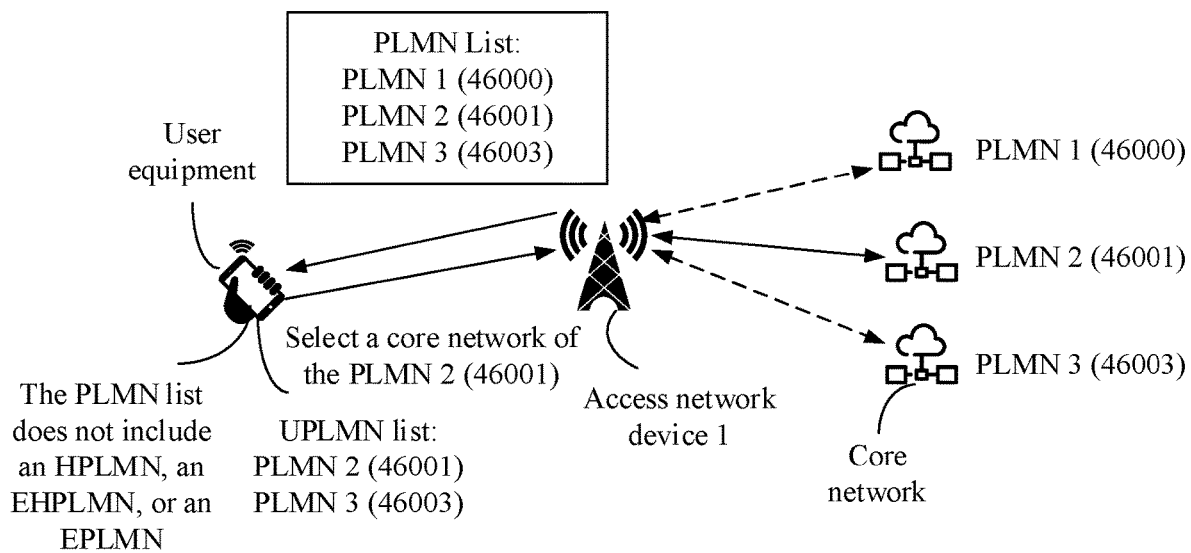
FIG. 9 is a schematic diagram of yet another emergency call according to an embodiment of the present invention.

For example, as shown in FIG. 9, if the PLMN list received by the user terminal includes a PLMN 1 (46000), a PLMN 2 (46001), and a PLMN 3 (46003), but the PLMN list does not include the HPLMN, the EHPLMN, or the EPLMN, the user terminal determines whether the PLMN list includes the UPLMN. If the UPLMNs include the PLMN 2 (46001) and the PLMN 3 (46003), the user terminal may determine that the PLMN list includes the UPLMN. In this case, the user terminal determines that the PLMN 2 (46001) or the PLMN 3 (46003) is an optimal PLMN, and the user terminal may make an emergency call through a core network of the PLMN 2 (46001) or the PLMN 3 (46003). In FIG. 9, for example, the user terminal makes the emergency call through the core network of the PLMN 2 (46001).

In an embodiment, if the PLMN list includes a plurality of UPLMNs, the user terminal may determine that a UPLMN with best signal quality in the plurality of UPLMNs is an optimal PLMN, or the user terminal may determine that a UPLMN used by the user most frequently in the plurality of UPLMNs is an optimal PLMN. Alternatively, a selection priority of each UPLMN during an emergency call may be preset. In this case, the user terminal selects one UPLMN from the plurality of UPLMNs based on the preset selection priority of each UPLMN to make an emergency call. For example, the UPLMNs include the PLMN 2 (46001) and the PLMN 3 (46003). In this case, a selection priority of the PLMN 2 (46001) may be preset to be higher than a selection priority of the PLMN 3 (46003). If the PLMN list includes both the PLMN 2 (46001) and the PLMN 3 (46003), the user terminal can preferentially select a core network of the PLMN 2 (46001) to make an emergency call.

In an embodiment, after the user terminal makes an emergency call through the core network of the UPLMN, if the user terminal detects that the emergency call fails, the user terminal may determine whether the PLMN list includes an OPLMN, and if the PLMN list includes the OPLMN, the user terminal makes the emergency call again through a core network of the OPLMN. In this optional manner, if the emergency call made through the core network of the UPLMN fails, the user terminal can automatically make the emergency call again through the core network of the OPLMN without a need of performing the emergency call operation again by the user. In actual application, signal quality of the UPLMN may be poor, and consequently the emergency call may fail. Therefore, when the emergency call made through the UPLMN fails, the user terminal may make the emergency call again through a core network of another PLMN. This helps increase a success rate of making the emergency call.

710: The user terminal determines whether the PLMN list includes the OPLMN. The user terminal performs operation 710 when the PLMN list includes the OPLMN, or the user terminal performs operation 711 when the PLMN list does not include the OPLMN. In other words, the user terminal performs operation 711 when the PLMN list does not include the HPLMN, the EHPLMN, the EPLMN, or the UPLMN, but includes the OPLMN, or the user terminal performs operation 712 when the PLMN list does not include the HPLMN, the EHPLMN, the EPLMN, the UPLMN, or the OPLMN.

In this embodiment of this application, for descriptions of the OPLMN, refer to the foregoing related descriptions. Details are not described herein again. Alternatively, when the PLMN list does not include the UPLMN, the user terminal may not determine whether the PLMN list includes the OPLMN, but the user terminal may determine, according to another rule, that a PLMN in the PLMN list is an optimal PLMN.

In an embodiment, the PLMN information obtained by the user terminal in operation 701 may further include the OPLMN. After obtaining the PLMN information, the user terminal may store the PLMN information in the memory, to store the OPLMN in the memory, so that the user terminal can subsequently obtain the OPLMN more quickly.

711: The user terminal determines that the OPLMN in the PLMN list is an optimal PLMN.

When the PLMN list does not include the HPLMN, the EHPLMN, the EPLMN, or the UPLMN, the OPLMN in the PLMN list is a PLMN that is most closely associated with the SIM card of the user terminal. Therefore, when the user terminal makes an emergency call through a core network of the OPLMN, the emergency call center can also successfully obtain the phone number of the user terminal.

Figure 10:
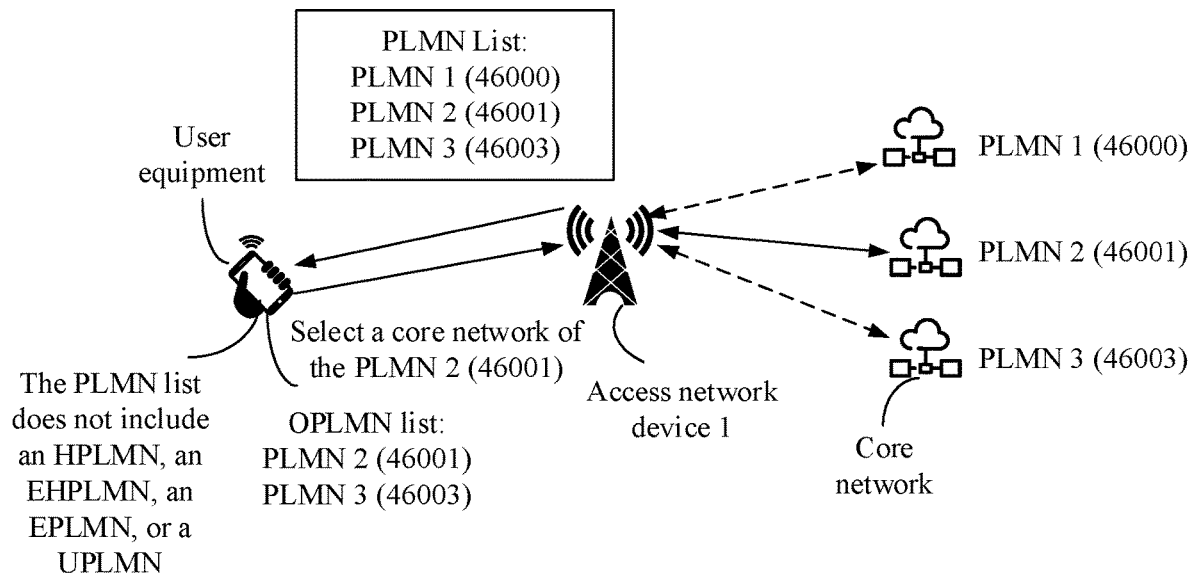
FIG. 10 is a schematic diagram of still yet another emergency call according to an embodiment of the present invention.

For example, as shown in FIG. 10, if the PLMN list received by the user terminal includes a PLMN 1 (46000), a PLMN 2 (46001), and a PLMN 3 (46003), but the PLMN list does not include the HPLMN, the EHPLMN, the EPLMN, or the UPLMN, the user terminal determines whether the PLMN list includes the OPLMN. If the OPLMNs include the PLMN 2 (46001) and the PLMN 3

(46003), the user terminal may determine that the PLMN list includes the OPLMN. In this case, the user terminal determines that the PLMN 2 (46001) or the PLMN 3 (46003) is an optimal PLMN, and the user terminal may make an emergency call through a core network of the PLMN 2 (46001) or the PLMN 3 (46003). In FIG. 10, for example, the user terminal makes the emergency call through the core network of the PLMN 2 (46001).

In an embodiment, if the PLMN list includes a plurality of OPLMNs, the user terminal may determine that an OPLMN with best signal quality in the plurality of OPLMNs is an optimal PLMN, or the user terminal may determine that an emergency call is made through a core network of an OPLMN used by the user most frequently in the plurality of OPLMNs. Alternatively, a selection priority of each OPLMN during an emergency call may be preset. In this case, the user terminal selects one OPLMN from the plurality of OPLMNs based on the preset selection priority of each OPLMN to make an emergency call. For example, the OPLMNs include the PLMN 2 (46001) and the PLMN 3 (46003). In this case, a selection priority of the PLMN 2 (46001) may be preset to be higher than a selection priority of the PLMN 3 (46003). If the PLMN list includes both the PLMN 2 (46001) and the PLMN 3 (46003), the user terminal can preferentially select a core network of the PLMN 2 (46001) to make an emergency call.

712: The user terminal determines that a PLMN with best signal quality in the PLMN list is an optimal PLMN.

Alternatively, when the PLMN list does not include the OPLMN, the user terminal may not determine that the PLMN with the best signal quality in the PLMN list is the optimal PLMN, but the user terminal may determine, according to another rule, that a PLMN in the PLMN list is an optimal PLMN.

Figure 11:
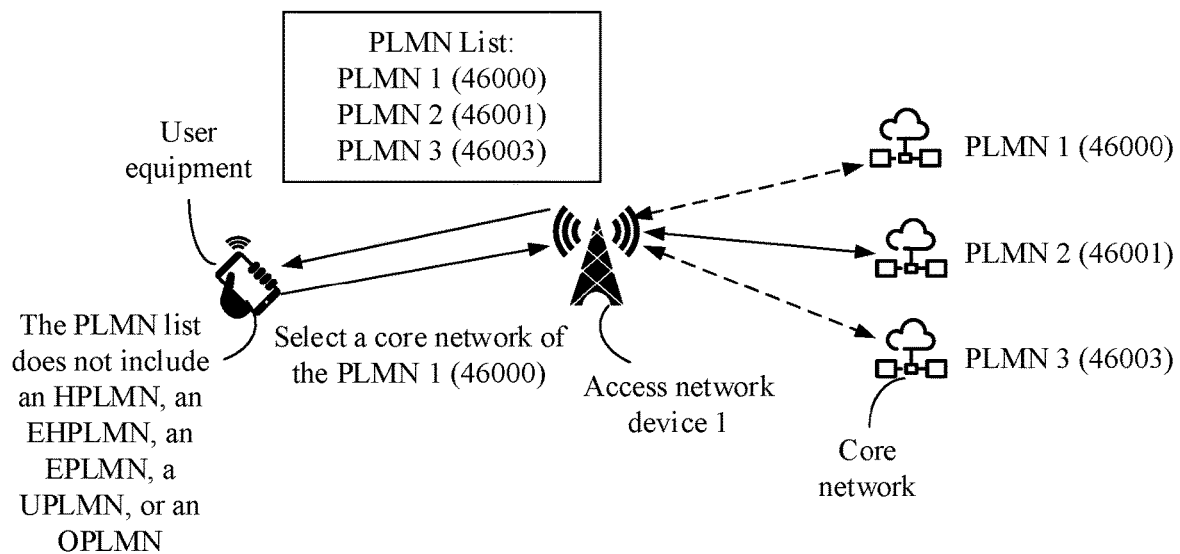
FIG. 11 is a schematic diagram of a further emergency call according to an embodiment of the present invention.

For example, as shown in FIG. 11, if the PLMN list received by the user terminal includes a PLMN 1 (46000), a PLMN 2 (46001), and a PLMN 3 (46003), but the PLMN list does not include the HPLMN, the EHPLMN, the EPLMN, the UPLMN, or the OPLMN, the user terminal sorts the PLMNs in the PLMN list based on signal quality. For example, if signal quality of the PLMN 1 (46000) is higher than signal quality of the PLMN 2 (46001), and the signal quality of the PLMN 2 (46001) is higher than signal quality of the PLMN 3 (46003), the user terminal determines that the PLMN 1 (46000) is an optimal PLMN. In this case, the user terminal makes an emergency call through a core network of the PLMN 1 (46000).

In an embodiment, the user terminal outputs prompt information if the user terminal determines that the PLMN with the best signal quality in the PLMN list is the optimal PLMN, where the prompt information is used to prompt that the emergency call center may fail to obtain a phone number of a calling user. In this manner, the user can learn whether the emergency call center can successfully obtain the phone number of the calling user, so that the user notifies the emergency call center of the phone number of the calling user in another manner. For example, the user can notify the emergency call center of the phone number orally when the emergency call center answers the call.

713: The user terminal makes an emergency call through a core network of the optimal PLMN.

For an implementation of operation 713, refer to the description corresponding to operation 305. Details are not described herein again.

In conclusion, after receiving the emergency call operation and the PLMN list, the user terminal may determine the optimal PLMN from the PLMN list based on the following priority sequence of the optimal PLMNs. The priority sequence of the optimal PLMNs may be: the HPLMN or the EHPLMN>the EPLMN>the UPLMN>the OPLMN>the PLMN with the best signal quality. To be specific, the user terminal first determines whether the PLMN list includes the HPLMN or the EHPLMN. If the PLMN list includes the HPLMN or the EHPLMN, the user terminal determines that the HPLMN or the EHPLMN is the optimal PLMN. If the user terminal determines that the PLMN list does not include the HPLMN or the EHPLMN, the user terminal determines whether the PLMN list includes the EPLMN. If the PLMN list includes the EPLMN, the user terminal determines that the EPLMN is the optimal PLMN. If the user terminal determines that the PLMN list does not include the EPLMN, the user terminal determines whether the PLMN list includes the UPLMN. If the PLMN list includes the UPLMN, the user terminal determines that the UPLMN is the optimal PLMN. If the PLMN list does not include the UPLMN, the user terminal determines whether the PLMN list includes the OPLMN. If the PLMN list includes the OPLMN, the user terminal determines that the OPLMN is the optimal PLMN. If the PLMN list does not include the OPLMN, the user terminal determines that the PLMN with the best signal quality in the PLMN list is the optimal PLMN. The optimal PLMN is determined based on the priority sequence, to help increase a success rate of obtaining the phone number of the user terminal by the emergency call center.

In the embodiments of the present invention, the user terminal may be divided into function modules based on the foregoing method examples. For example, function modules corresponding to the functions may be obtained through division, or two or more functions may be integrated into one module. The integrated module may be implemented in a form of hardware, or may be implemented in a form of a software function module. It should be noted that in the embodiments of the present invention, division into the modules is an example and is merely logical function division, and may be other division in an actual implementation.

Figure 12:
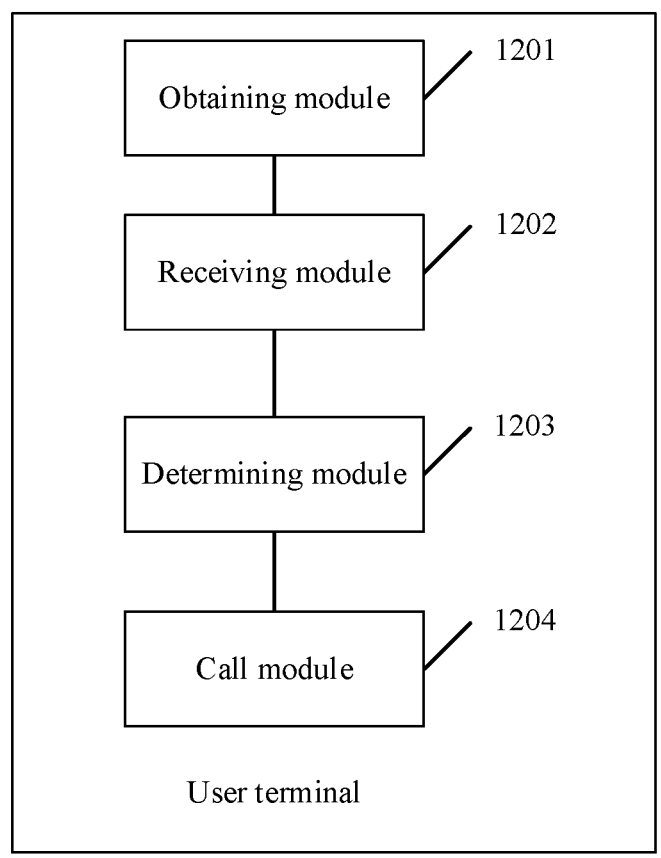
FIG. 12 is a schematic structural diagram of a user terminal according to an embodiment of the present invention.
Figure 13:
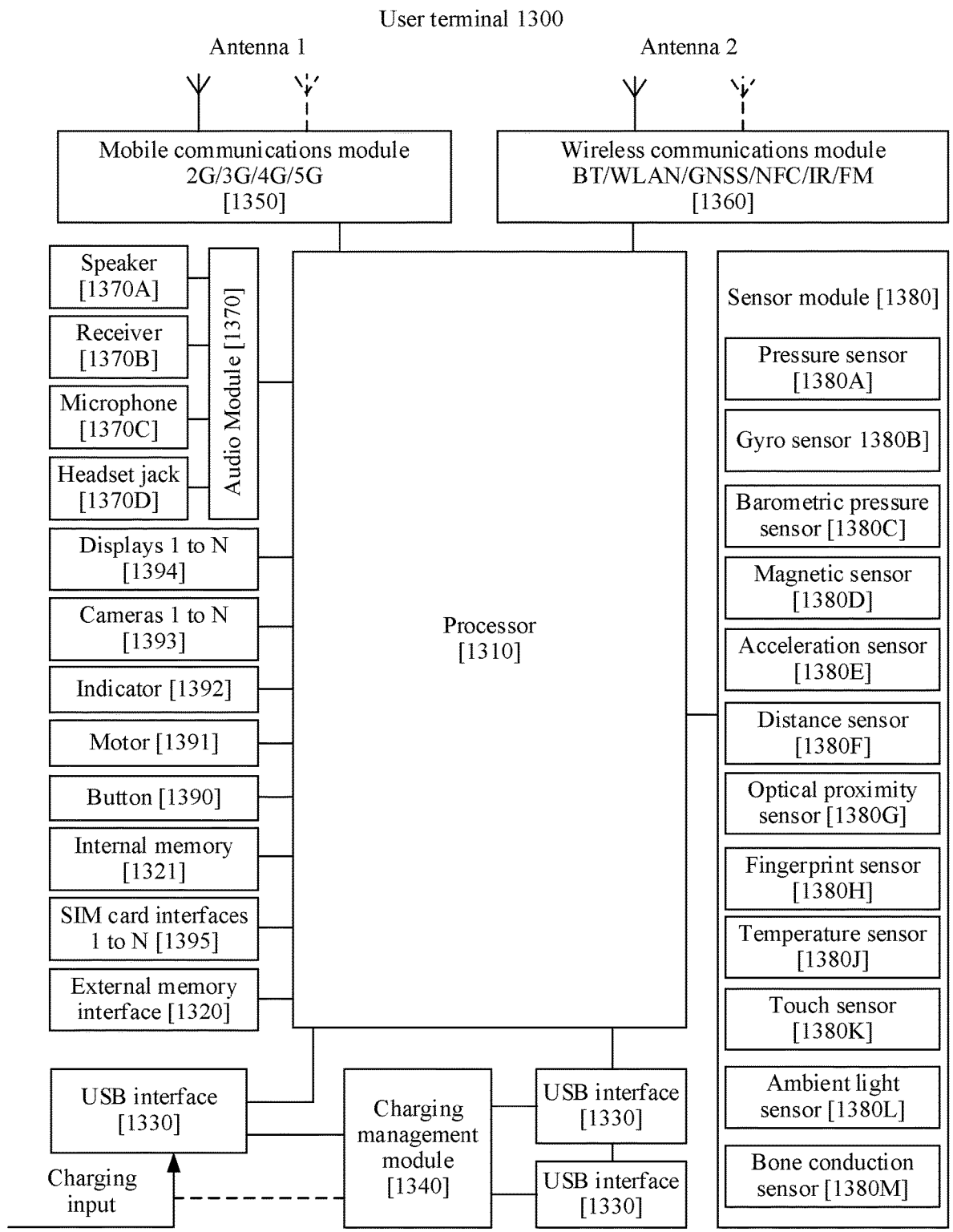
FIG. 13 is a schematic structural diagram of another user terminal according to an embodiment of the present invention.

FIG. 12 is a schematic structural diagram of a user terminal according to an embodiment of this application. The user terminal in this embodiment of this application may be configured to perform some or all functions of the user terminal in the foregoing method embodiments. The user terminal may include an obtaining module 1201, a receiving module 1202, a determining module 1203, and a call module 1204.

The obtaining module 1201 is configured to obtain PLMN information from a subscriber identification module SIM card of the user terminal, where the PLMN information includes a home public land mobile network HPLMN and an equivalent home public land mobile network EHPLMN. The receiving module 1202 is configured to receive an emergency call operation of a user. The receiving module 1202 is further configured to receive, in response to the emergency call operation of the user, a public land mobile network PLMN list that is broadcast by an access network device, where the access network device is an access network device in a multi-operator core network MOCN, and the PLMN list includes a plurality of PLMNs that share the access network device. The determining module 1203 is configured to: when the PLMN list includes the HPLMN or the EHPLMN, determine that the HPLMN or the EHPLMN in the PLMN list is an optimal PLMN. The call module 1204 is configured to make an emergency call through a core network of the optimal PLMN.

In an embodiment, after obtaining the PLMN information from the subscriber identification module SIM card of the user terminal, the obtaining module 1201 may further store the PLMN information in a memory of the user terminal.

In an embodiment, the user terminal further includes a sending module. The obtaining module 1201 is further configured to obtain location information of the user terminal after the receiving module 1202 receives the emergency call operation of the user. The sending module is configured to send the location information of the user terminal to an emergency call center through the core network of the optimal PLMN.

In an embodiment, the user terminal further includes a sending module. The obtaining module 1201 is further configured to obtain user personal information after the receiving module 1202 receives the emergency call operation of the user. The sending module is configured to send the user personal information to the emergency call center through the core network of the optimal PLMN. There is a correspondence between an emergency call type and user personal information. The obtaining module 1201 may obtain corresponding user personal information based on an emergency call type.

In an embodiment, the determining module 1203 is further configured to: when the PLMN list does not include the HPLMN or the EHPLMN, but the PLMN list includes an equivalent public land mobile network EPLMN, determine that the EPLMN in the PLMN list is an optimal PLMN.

In an embodiment, a manner in which the determining module 1203 determines that the EPLMN in the PLMN list is the optimal PLMN is specifically: determining that an EPLMN with best signal quality in the PLMN list is the optimal PLMN.

In an embodiment, the determining module 1203 is further configured to: when the PLMN list does not include the HPLMN, the EHPLMN, or the EPLMN, but the PLMN list includes a user controlled public land mobile network UPLMN, determine that the UPLMN in the PLMN list is an optimal PLMN.

In an embodiment, the determining module 1203 is further configured to: when the PLMN list does not include the HPLMN, the EHPLMN, the EPLMN, or the UPLMN, but the PLMN list includes an operator controlled public land mobile network OPLMN, determine that the OPLMN in the PLMN list is an optimal PLMN.

In an embodiment, the determining module 1203 is further configured to: when the PLMN list does not include the HPLMN, the EHPLMN, the EPLMN, the EPLMN, the UPLMN, or the OPLMN, determine that a PLMN with best signal quality in the PLMN list is an optimal PLMN.

In an embodiment, the user terminal further includes an output module. The output module is configured to output prompt information if the determining module 1203 determines that the PLMN with the best signal quality in the PLMN list is the optimal PLMN, where the prompt information is used to prompt that the emergency call center may fail to obtain a phone number of a calling user.

In an embodiment, the PLMN information further includes the UPLMN and the OPLMN.

In an embodiment, the receiving module 1202 is further configured to receive an EPLMN list.

In an embodiment, the optimal PLMN is the HPLMN or the EHPLMN in the PLMN list. The call module 1204 is further configured to: if the emergency call made through the core network of the optimal PLMN fails, and the PLMN list includes an EPLMN, make an emergency call through a core network of the EPLMN.

In an embodiment, the optimal PLMN is the EPLMN in the PLMN list. The call module 1204 is further configured to: if the emergency call made through the core network of the optimal PLMN fails, and the PLMN list includes a UPLMN, make an emergency call through a core network of the UPLMN.

In an embodiment, the optimal PLMN is the UPLMN in the PLMN list. The call module 1204 is further configured to: if the emergency call made through the core network of the optimal PLMN fails, and the PLMN list includes an OPLMN, make an emergency call through a core network of the OPLMN.

In an embodiment, the user terminal further includes a prompt module, configured to: if duration of the emergency call reaches preset duration or a quantity of emergency call failure times reaches a preset quantity of times, prompt the user that the call fails.

Based on a same inventive concept, for problem-resolving principles and beneficial effects of the user terminal, refer to the implementations and the beneficial effects of the foregoing method embodiments. Details are not described again.

It should be noted that in the foregoing embodiments, the descriptions of the embodiments have respective focuses. For a part that is not described in detail in an embodiment, refer to related descriptions in other embodiments.

Operations in the methods in the embodiments of the present invention may be adjusted in terms of a sequence, combined, or deleted based on an actual requirement.

The modules in the user terminal in the embodiments of the present invention may be combined, divided, or deleted based on an actual requirement.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state drive (SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An emergency call method, further comprising:
   obtaining public land mobile network (PLMN) information from a subscriber identification module (SIM) card of a user terminal, wherein the PLMN information comprises a home PLMN (HPLMN) and an equivalent HPLMN (EHPLMN);
   receiving an emergency call operation of a user;
   receiving, in response to the emergency call operation of the user, a PLMN list that is broadcast by an access network device, wherein the access network device is in a multi-operator core network (MOCN), and the PLMN list comprises a plurality of PLMNs that share the access network device;
   determining an optimal PLMN from the plurality of PLMNs by comparing the PLMN information and the PLMN list; and
   making an emergency call through a core network of the optimal PLMN.

2. The method according to claim 1, further comprising:
   obtaining location information of the user terminal after the receiving an emergency call operation of a user; and
   sending the location information of the user terminal to an emergency call center through the core network of the optimal PLMN.

3. The method according to claim 1, wherein the determining the optimal PLMN further comprises:
   when the PLMN list comprises the HPLMN or the EHPLMN, determining that one of the HPLMN or the EHPLMN is the optimal PLMN, and
   when the PLMN list does not comprise the HPLMN or the EHPLMN, determining that the PLMN list comprises an equivalent PLMN (EPLMN), and in response to determining that the PLMN list comprises the EPLMN, determining that the EPLMN in the PLMN list is the optimal PLMN.

4. The method according to claim 1, wherein the determining the optimal PLMN further comprises:
   in response to determining that the PLMN list does not comprise the HPLMN or the EHPLMN but comprises one or more equivalent PLMNs (EPLMN), selecting an EPLMN with best signal quality from the one or more EPLMNs as the optimal PLMN.

5. The method according to claim 1, wherein the determining the optimal PLMN further comprises:
   in response to determining that the PLMN list does not comprise the HPLMN, the EHPLMN, or an equivalent PLMN (EPLMN), but comprises a user controlled public land mobile network (UPLMN), determining that the UPLMN in the PLMN list is the optimal PLMN.

6. The method according to claim 1, wherein the determining the optimal PLMN further comprises:
   in response to determining that the PLMN list does not comprise the HPLMN, the EHPLMN, an equivalent (EPLMN), or a user controlled PLMN (UPLMN), but comprises an operator controlled PLMN (OPLMN), determining that the OPLMN in the PLMN list is the optimal PLMN.

7. The method according to claim 1, wherein the determining the optimal PLMN further comprises:
   in response to determining that the PLMN list does not comprise the HPLMN, the EHPLMN, an equivalent PLMN (EPLMN), a user controlled PLMN (UPLMN), or an operator controlled PLMN (OPLMN), determining that a PLMN with best signal quality in the PLMN list is the optimal PLMN.

8. The method according to claim 7, wherein the PLMN information further comprises the UPLMN and the OPLMN.

9. The method according to claim 3, further comprising:
   before the receiving the emergency call operation of the user, the method further comprises:
   receiving an EPLMN list.

10. The method according to claim 1, wherein the making the emergency call through the core network of the optimal PLMN further comprises:
    determining that making an emergency call through the core network of the optimal PLMN,
    in response to determining that the emergency call made through the core network of the optimal PLMN fails, and the PLMN list comprises an equivalent PLMN (EPLMN), making an emergency call through a core network of the EPLMN.

11. The method according to claim 10, further comprising:
    in response to determining that duration of the emergency call reaches preset duration or a quantity of emergency call failure times reaches a preset quantity of times, prompting the user that the emergency call fails.

12. A user terminal, further comprising:
    a processor;
    a memory coupled with the processor and storing program instructions, which, when executed by the processor, cause the processor to perform operations comprising:
    obtaining public land mobile network (PLMN) information from a subscriber identification module (SIM) card of the user terminal, wherein the PLMN information comprises a home PLMN (HPLMN) and an equivalent HPLMN (EHPLMN);
    receiving an emergency call operation of a user;
    receiving, in response to the emergency call operation of the user, a PLMN list that is broadcast by an access network device, wherein the access network device is in a multi-operator core network MOCN, and the PLMN list comprises a plurality of PLMNs that share the access network device;
    determining an optimal PLMN from the plurality of PLMNs by comparing the PLMN information and the PLMN list; and
    making an emergency call through a core network of the optimal PLMN.

13. The user terminal according to claim 12, the operations further comprising
    obtaining location information of the user terminal after receiving the emergency call operation of the user; and
    sending the location information of the user terminal to an emergency call center through the core network of the optimal PLMN.

14. The user terminal according to claim 12, wherein the determining the optimal PLMN further comprising
    when the PLMN list comprises the HPLMN or the EHPLMN, determining that one of the HPLMN or the EHPLMN is the optimal PLMN; and
    when the PLMN list does not comprise the HPLMN or the EHPLMN, determining that the PLMN list comprises an equivalent PLMN (EPLMN), determining that the EPLMN in the PLMN list is the optimal PLMN.

15. The user terminal according to claim 12, wherein the determining the optimal PLMN further comprises:

in response to determining that the PLMN list does not comprise the HPLMN or the EHPLMN but comprises one or more equivalent PLMNs (EPLMN), determining that an EPLMN with best signal quality in the PLMN list is the optimal PLMN.

16. The user terminal according to claim 12, wherein the determining the optimal PLMN further comprises:
in response to determining that the PLMN list does not comprise the HPLMN, the EHPLMN, or an equivalent PLMN (EPLMN), but comprises a user controlled PLMN (UPLMN), determining that the UPLMN in the PLMN list is the optimal PLMN.

17. The user terminal according to claim 12, wherein the determining the optimal PLMN further comprises:
in response to determining that the PLMN list does not comprise the HPLMN, the EHPLMN, an equivalent PLMN (EPLMN), or a user controller PLMN (UPLMN), but comprises an operator controlled PLMN (OPLMN), determining that the OPLMN in the PLMN list is the optimal PLMN.

18. The user terminal according to claim 17, wherein the determining the optimal PLMN further comprises:
in response to determining that the PLMN list does not comprise the HPLMN, the EHPLMN, an equivalent PLMN (EPLMN), or an operator controlled PLMN (OPLMN), determining that a PLMN with best signal quality in the PLMN list is the optimal PLMN.

19. The user terminal according to claim 18, wherein the PLMN information further comprises the UPLMN and the OPLMN.

20. A chip system, comprising:
a processor; and
an interface circuit is coupled to the processor;
wherein the processor is configured to execute program instruction to perform operations comprising;
obtaining PLMN information from a subscriber identification module SIM card of a user terminal, wherein the PLMN information comprises a home public land mobile network HPLMN and an equivalent home public land mobile network EHPLMN,
receiving an emergency call operation of a user,
receiving, in response to the emergency call operation of the user, a public land mobile network PLMN list that is broadcast by an access network device, wherein the access network device is an access network device in a multi-operator core network MOCN, and the PLMN list comprises a plurality of PLMNs that share the access network device,
when the PLMN list comprises the HPLMN or the EHPLMN, determining that the HPLMN or the EHPLMN in the PLMN list is an optimal PLMN, and
making an emergency call through a core network of the optimal PLMN; and
wherein the interface circuit is configured to communicate with another module outside the chip system.

* * * * *